US012449769B2

(12) United States Patent
Joachim et al.

(10) Patent No.: US 12,449,769 B2
(45) Date of Patent: Oct. 21, 2025

(54) HOROLOGICAL SWITCHABLE DISPLAY MECHANISM

(71) Applicant: Glashütter Uhrenbetrieb GmbH, Sachsen (DE)

(72) Inventors: Max Joachim, Dresden (DE); Tony Braun, Müglitztal (DE)

(73) Assignee: Glashütter Uhrenbetrieb GmbH, Sachsen (DE)

( * ) Notice: Subject to any disclaimer, the term of this patent is extended or adjusted under 35 U.S.C. 154(b) by 337 days.

(21) Appl. No.: 18/295,636

(22) Filed: Apr. 4, 2023

(65) Prior Publication Data

US 2023/0350348 A1 Nov. 2, 2023

(30) Foreign Application Priority Data

Apr. 29, 2022 (EP) .................................... 22170928

(51) Int. Cl.
*G04B 19/02* (2006.01)

(52) U.S. Cl.
CPC .................................... *G04B 19/02* (2013.01)

(58) Field of Classification Search
CPC ........ G04B 19/02; G04B 27/00; G04B 19/22; G04B 19/00; G04B 13/00; G04B 13/02; G04B 19/06; G04B 19/16; G04B 19/223; G04B 19/24
See application file for complete search history.

(56) References Cited

U.S. PATENT DOCUMENTS

| | | | | |
|---|---|---|---|---|
| 2008/0205200 A1* | 8/2008 | Spode | G04B 19/048 | 368/220 |
| 2009/0310445 A1 | 12/2009 | Laucella et al. | | |
| 2014/0104991 A1* | 4/2014 | Rochat | G04B 19/23 | 368/21 |

FOREIGN PATENT DOCUMENTS

| | | | |
|---|---|---|---|
| EP | 1 959 317 | A1 | 8/2008 |
| EP | 2 136 271 | B1 | 12/2010 |
| JP | 2009-300447 | A | 12/2009 |
| WO | 2013-030268 | A1 | 3/2013 |

OTHER PUBLICATIONS

European Search Report for 22 17 0928 dated, Oct. 11, 2022.

* cited by examiner

*Primary Examiner* — Edwin A. Leon
(74) *Attorney, Agent, or Firm* — Sughrue Mion, PLLC

(57) ABSTRACT

A horological mechanism with a first mechanism (100) and a first output wheel set (101), a second mechanism and a second output wheel set (102), for displaying a first or a second indication specific to the first mechanism (100) or second mechanism (200), by a switching and coupling mechanism (500), including, on a coupling arbor (937, 938), two input wheel sets (1; 2) connected to the output wheel sets (101; 102), a sliding wheel set moving under constant strain between these input wheel sets (1; 2), and cooperating alternately and exclusively, by clicking in a single angular position per revolution, with either one, selected under the action of a command from a user on a controller, to establish a driving connection between the input wheel set engaged with the sliding wheel set at the given moment in time, and a display.

25 Claims, 22 Drawing Sheets

G

H

A

B

C

A

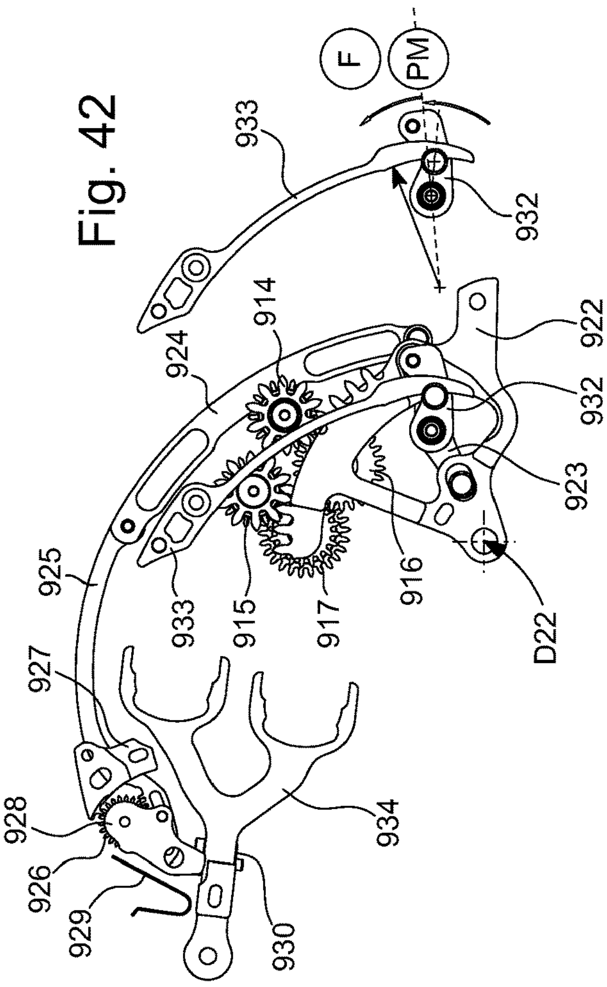
Fig. 40
Fig. 42
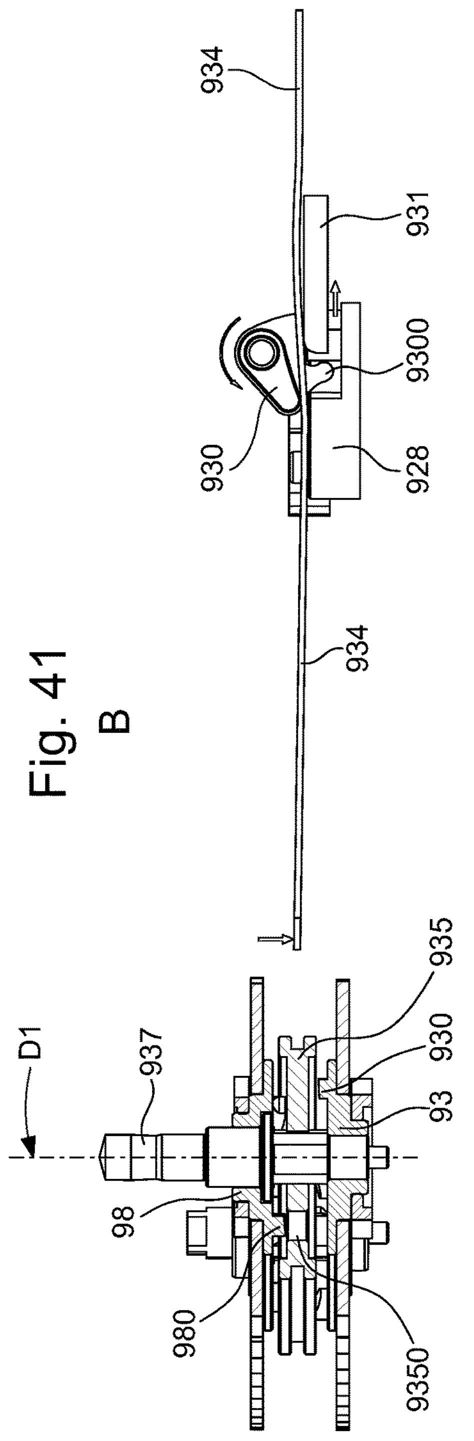
Fig. 41
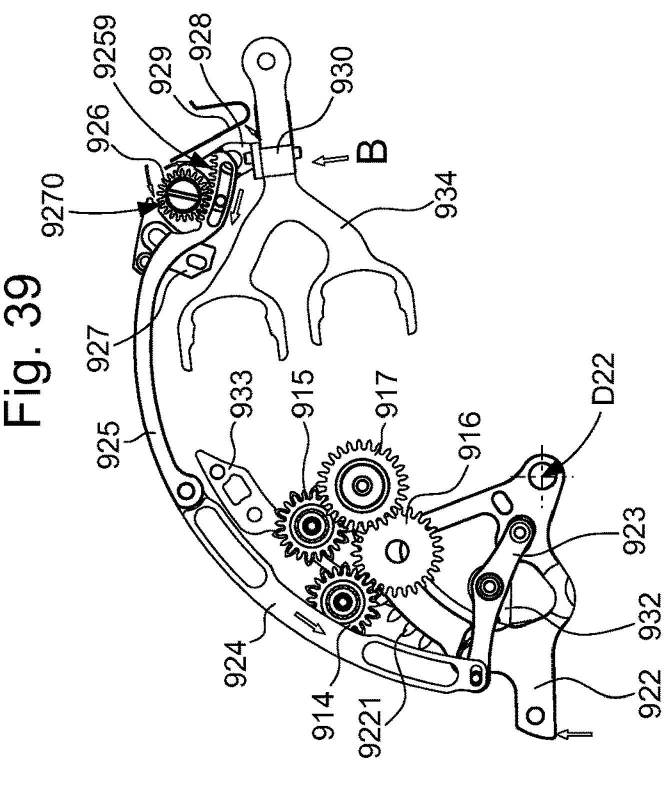
Fig. 39

HOROLOGICAL SWITCHABLE DISPLAY MECHANISM

CROSS REFERENCE TO RELATED APPLICATIONS

The present application is based on, and claims priority from the prior European Patent Application No. 22170928.0, filed on Apr. 29, 2022, the entire contents of which are incorporated herein by reference.

TECHNICAL FIELD OF THE INVENTION

The invention relates to a horological mechanism comprising a first mechanism, in particular a first train, comprising a first output wheel set capable of moving by pivoting, and a second mechanism, in particular a second train, comprising a second output wheel set capable of moving by pivoting, and which are arranged to control the motion of a third mechanism.

More particularly, this third mechanism is a display mechanism for the respective display, on demand, on at least one display means, of a first or of a second indication specific to the first mechanism, and to the second mechanism respectively.

The invention further relates to a timepiece comprising at least one such horological mechanism.

The invention further relates to a method for switching between two input mechanisms to control an output mechanism.

The invention relates to the field of horological complications, and more particularly to the field of horological displays.

TECHNOLOGICAL BACKGROUND

Switching between different displays is a popular complication for timepiece enthusiasts, which requires a large amount of space inside a mechanical timepiece, due to the additional mechanisms and trains that are added to those of a basic display. The most well-known applications involve switching between a time display and a countdown display on a chronograph, or changing time zones.

The complexity of these mechanisms is such that such switching mechanisms are typically dedicated to a single application, and it is difficult to modify them to design other display changes.

SUMMARY OF THE INVENTION

The aim of the invention is to develop a switching mechanism, in particular a display switching mechanism, which is as universal as possible and which allows it to be used for a wide variety of applications. This switching mechanism is designed in a simple way, avoiding the need to use expensive and fragile differential elements, which are often used in switching mechanisms. The need to use relative positioning elements, such as heart-pieces, is also avoided.

For this purpose, the invention relates to a horological mechanism according to claim 1.

The invention further relates to a timepiece comprising at least one such horological mechanism.

The invention further relates to a method for switching between two input mechanisms to control an output mechanism.

BRIEF DESCRIPTION OF THE FIGURES

The aims, advantages and features of the invention will become more apparent upon reading the following detailed description, with reference to the accompanying drawings, among which:

FIGS. 3 to 51 show in detail a specific and non-limiting embodiment of the invention. Numerous figures are grouped into pairs, each representing a part of the mechanism on a first side, referred to as the dial side, which comprises the components carrying the displays, in particular but not limited to the hands, and on a second opposite side, referred to as the bar side. By pure convention, the two horological mechanisms, which are more particularly horological movements, and which are being switched, are qualified as "upper" and "lower". The grouping of the components in each figure corresponds to a specific function;

FIG. 3 diagrammatically shows a perspective view of the entire mechanism from the dial side, and FIG. 4 shows the same mechanism in a similar manner from the bar side;

FIG. 5 diagrammatically shows a perspective view of a control mechanism from the dial side, comprising, between a user-operated control lever with a toothed sector and a pivoting flap intended to bear against the spring strip comprising the forks for connection with the slides, a succession of levers articulated to one another, the last whereof, subjected in its plane to the pressure of a lever spring, carries a pinion which is or is not cooperating with a single tooth comprised in a fixed plate, and is arranged to trigger the rotation of a pivoting flap, about an axis in a plane perpendicular to its own, this pivoting flap controlling the position of the switching control spring strip;

FIG. 6 shows the same control mechanism in a similar manner from the bar side;

FIG. 7 diagrammatically shows a side view according to the arrow G in FIG. 5 of the control mechanism and the stack of levers, and the lever spring, which can advantageously be adjusted during assembly;

FIG. 8 diagrammatically shows a perspective view of a return mechanism for returning to the rest position on the dial side, comprising a return lever articulated to the control lever, and a large return spring, also visible in FIG. 4, and bearing against this return lever;

FIG. 9 shows the same return mechanism in a similar manner from the bar side;

FIG. 10 diagrammatically shows a side view according to the arrow H in FIG. 8 of the same return mechanism;

FIG. 11 diagrammatically shows a perspective view of a vertical coupling mechanism, seen from the dial side, which comprises the Y-shaped spring strip, comprising forks for moving the first slide and the second slide respectively on the minute and hour coupling arbors; in the bottom part of the figure, a cannon-pinion on the first minute coupling arbor is intended to receive a minute display, whereas the other arbor, in the top part of the figure, which is the second hour coupling arbor, comprises an hour wheel for displaying the time;

FIG. 12 shows the same vertical coupling mechanism in a similar manner from the bar side;

FIG. 13 diagrammatically shows a side view according to the arrow I in FIG. 11 of the same vertical coupling mechanism;

FIG. 14 diagrammatically shows a side view of the same vertical coupling mechanism, completed by various wheel sets belonging to sub-assemblies described hereinbelow, and, from bottom to top in the figure: a transfer train of the lower movement, a transfer train of the upper movement, and a transfer train of the hour display, the latter terminated by an hour wheel mounted coaxially to the cannon-pinion in FIG. 11;

FIG. 15 diagrammatically shows a cross-section through the first minute coupling arbor and through the second hour coupling arbor, of the various wheel sets visible in FIG. 14, the arbors whereof are not shown sectionally;

FIG. 16 diagrammatically shows a perspective view, from the dial side, of the transfer train of the lower movement, comprising in particular a lower minute wheel and a lower hour wheel, each comprising protrusions arranged to cooperate with slots in the minute and hour coupling discs, visible in the bottom part of FIGS. 14 and 15;

FIG. 17 shows the same transfer train of the lower movement in a similar manner from the bar side;

FIG. 18 diagrammatically shows a side view according to the arrow A in FIG. 16 of the same transfer train of the lower movement;

FIG. 19 diagrammatically shows a perspective view, from the dial side, of the transfer train of the upper movement, comprising in particular an upper minute wheel and an upper hour wheel, each comprising protrusions arranged to cooperate the slots in the minute and hour coupling discs, as visible in the middle part of FIGS. 14 and 15;

FIG. 20 shows the same transfer train of the upper movement in a similar manner from the bar side;

FIG. 21 diagrammatically shows a side view according to the arrow B in FIG. 19 of the same transfer train of the upper movement;

FIG. 22 diagrammatically shows a perspective view, from the dial side, of a rotation compensating mechanism comprising a first ball bearing freewheel wheel set and a second ball bearing freewheel wheel set which is blocking in the opposite direction; the various freewheel wheel sets in this mechanism are all stepped, and comprise an upper wheel meshing with a train and a wheel comprising the ball bearing freewheel;

FIG. 23 shows the same rotation compensating mechanism in a similar manner from the bar side;

FIG. 24 diagrammatically shows a top view of the two freewheels of the same rotation compensating mechanism;

FIG. 25 diagrammatically shows a side view according to the arrow D in FIG. 22 of the same rotation compensating mechanism;

FIG. 26 diagrammatically shows a perspective view, from the dial side, of an hour rotation decoupling mechanism, comprising a third ball bearing freewheel wheel set meshing with an hour friction wheel set;

FIG. 27 shows the same hour rotation decoupling mechanism in a similar manner from the bar side;

FIG. 28 diagrammatically shows a side view according to the arrow E in FIG. 26 of the same hour rotation decoupling mechanism;

FIG. 29 diagrammatically shows a perspective view, from the dial side, of a minute rotation decoupling mechanism, comprising a fourth ball bearing freewheel wheel set meshing with a minute friction wheel set;

FIG. 30 shows the same minute rotation decoupling mechanism in a similar manner from the bar side;

FIG. 31 diagrammatically shows a side view according to the arrow F in FIG. 29 of the same minute rotation decoupling mechanism;

FIG. 32 diagrammatically shows a perspective view, from the dial side, of the transfer train of the hour display visible in the top part of FIGS. 14 and 15;

FIG. 33 shows the same transfer train of the hour display in a similar manner from the bar side;

FIG. 34 diagrammatically shows a side view according to the arrow C in FIG. 32 of the same transfer train of the hour display;

FIG. 35 diagrammatically shows a partial, top view of the lower part of the same switching unit, limited to the sliding wheel set and the arbor thereof, to the second lower coupling wheel, and to the second lower input wheel set; the complementary cooperating reliefs can be seen: the second coupling wheel respectively comprises a second coupling element, in the coupling position, with a second complementary coupling element comprised in the sliding wheel set; in this non-limiting embodiment, the sliding wheel set comprises a second complementary coupling element formed of three female reliefs, which are oblongs that are not at equal angular distances from one another, and which are placed on different radii relative to the slide axis; the second coupling wheel comprises a second coupling element formed of three male reliefs, in the form of posts with a sloping or radiating surface to facilitate meshing, these posts are disposed geometrically in the same manner as the three female reliefs of the sliding wheel set; this disposition guarantees a single cooperation position per revolution, and precise indexing; other compositions of male and female reliefs between the surfaces of the sliding wheel set and the antagonistic surfaces of the first coupling wheel and of the second coupling wheel can also be chosen while remaining within the scope of the invention; the figure shows the single position per revolution for cooperation between the protrusions of the minute and hour wheels on the one hand, and the slots in the coupling discs of the minute and hour sliding wheel sets on the other hand, in this specific example;

FIGS. 36 to 50 show the main steps of the operation of switching from the time information of the upper movement to that of the lower movement, with this embodiment of the invention;

FIG. 36 diagrammatically shows a plan view, from the dial side, of the control mechanism already shown in FIGS. 5 to 7, in a switching start position;

FIG. 37 shows the same mechanism in a similar manner from the bar side;

FIG. 38 diagrammatically shows a side view according to the arrow A in FIG. 36, of the same mechanism, the spring strip whereof is bent in a rest position, and is not in contact with the pivoting flap, and with the sliding wheel sets in the high position;

FIG. 39 shows the same mechanism in a similar manner to FIG. 36, with the minutes and hours in a disengaged position;

FIG. 40 shows the same mechanism, in the position of FIG. 39, from the bar side;

FIG. 41 diagrammatically shows a side view according to the arrow B in FIG. 39, of the same mechanism in the position in FIGS. 39 and 40, the spring strip whereof being pressed by the pivoting flap, and with the sliding wheel sets in the middle position;

FIG. 42 diagrammatically shows a plan view, from the bar side, in a similar manner to FIG. 9, of the feature of the mechanism for returning to the rest position, with the passage through a dead centre when the return spring ceases to oppose the switching, before accompanying this switching; the dead centre position is indicated by the letters PM;

FIG. 43 shows the same mechanism in a similar manner to FIG. 36, with the minutes and hours in a disengaged position;

FIG. 44 shows the same mechanism, in the position of FIG. 42, from the bar side;

FIG. 45 diagrammatically shows a side view according to the arrow C in FIG. 43, of the same mechanism in the position in FIGS. 43 and 44, the spring strip whereof is pressed by the pivoting flap in the lowest position thereof, and with the sliding wheel sets in the low position;

FIGS. 46 to 49 diagrammatically show the cooperation between the control lever and the freewheels visible in FIGS. 22 to 25;

FIG. 46 shows, from a side view, the cooperation between the first freewheel wheel set, moving in the clockwise direction, and a first lower cylindrical bearing surface of the control lever, preventing it from rotating, and the cooperation between the second freewheel wheel set, moving in the anti-clockwise direction, and a second upper toothed sector of the control lever, allowing it to rotate;

FIG. 47 shows a perspective view of the control lever with, at its lower part, arranged to cooperate with the first freewheel wheel set, a first cylindrical bearing surface adjacent to a first toothed sector, and, at its upper part, arranged to cooperate with the second freewheel wheel set, a second cylindrical bearing surface adjacent to a second toothed sector, these toothed sectors extending either side of the cylindrical bearing surfaces;

FIG. 48 shows, from the dial side, the lever and the freewheels in the position shown in FIG. 46 when the control lever starts to rotate clockwise;

FIG. 49 shows, from the dial side, the lever and the freewheels as the clockwise rotation of the control lever continues, during which time the first freewheel wheel set leaves the first cylindrical bearing surface to mesh with the first toothed sector, whereas the second freewheel wheel set leaves the second toothed sector to bear against the second cylindrical bearing surface;

FIG. 50 shows, from the dial side, the control lever and the cooperation between the various wheels comprised in:

Figure 27:
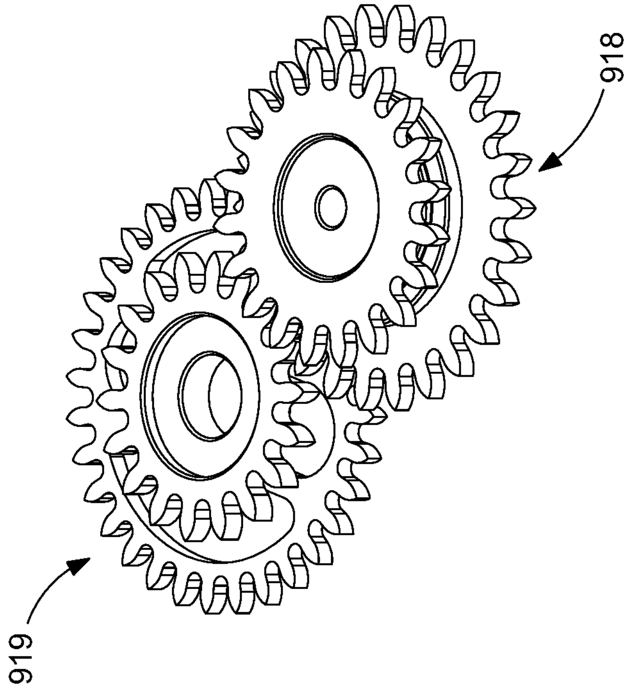
Figure 28:
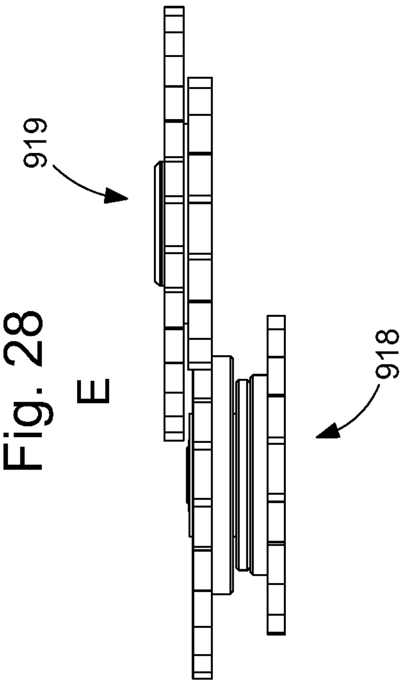
Figure 26:
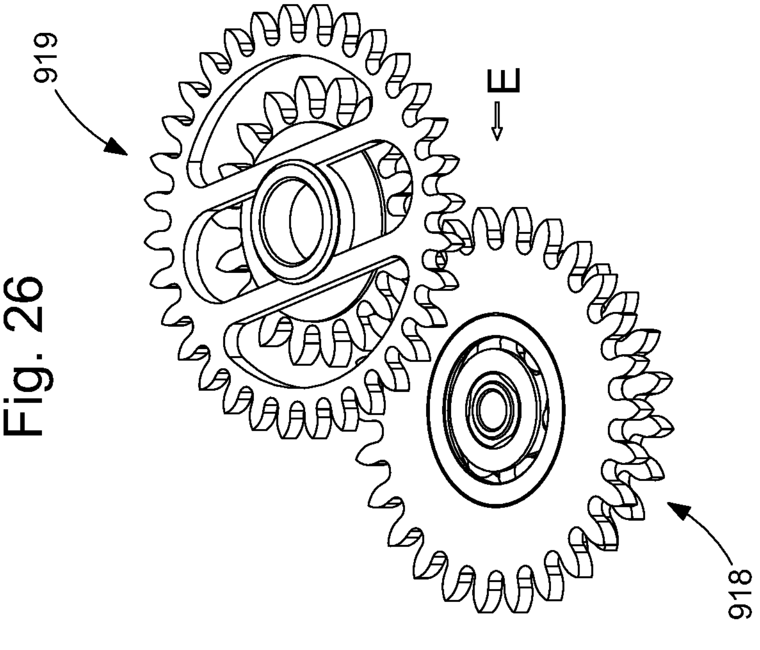
Figure 30:
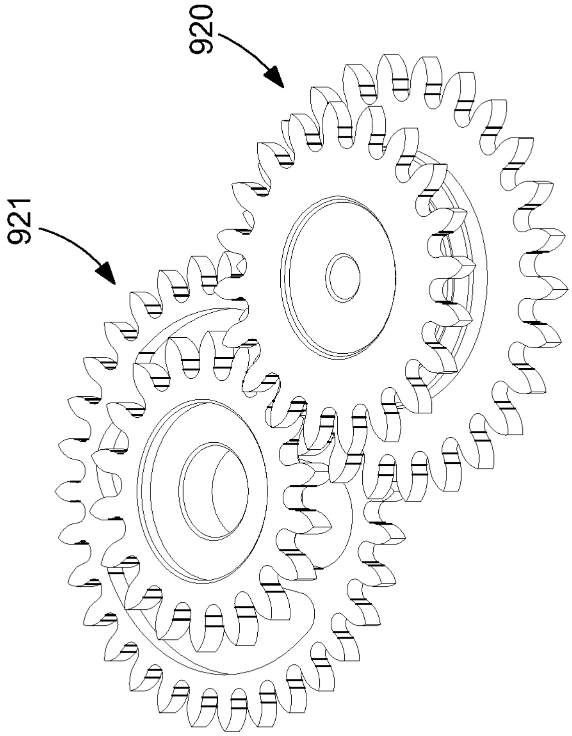
Figure 29:
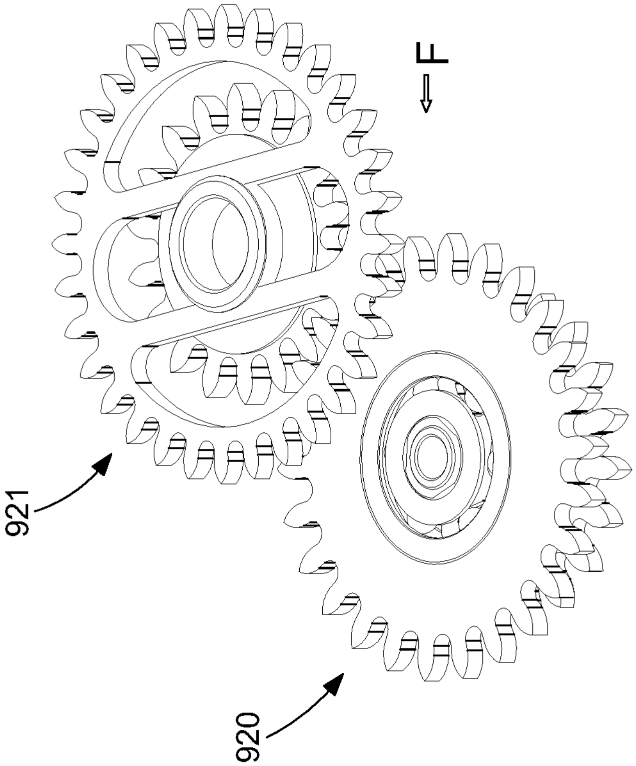
Figure 31:
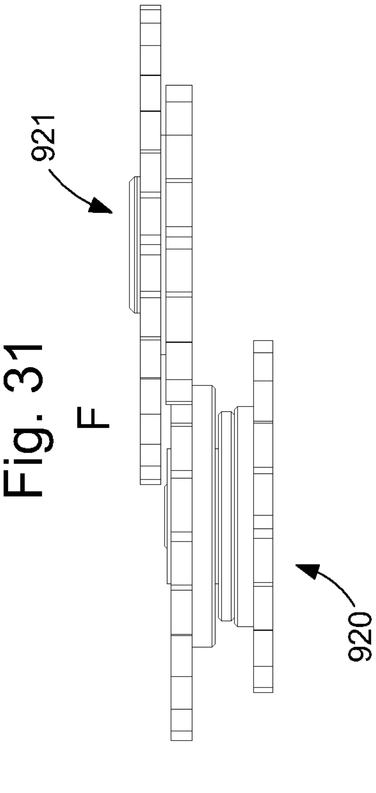
Figure 33:
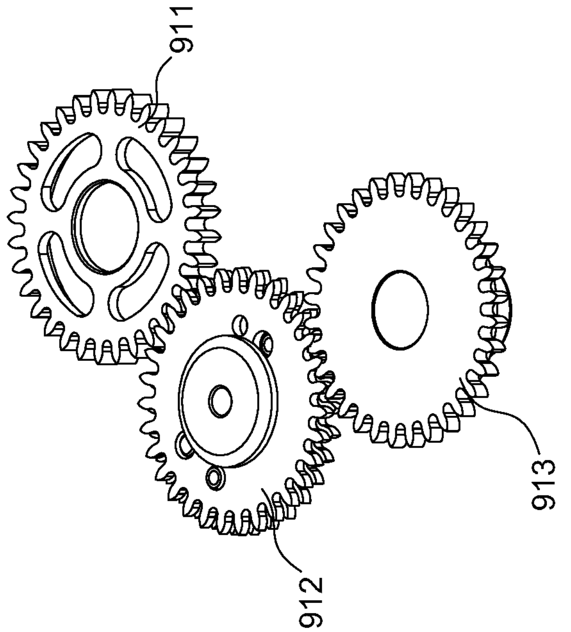
Figure 32:
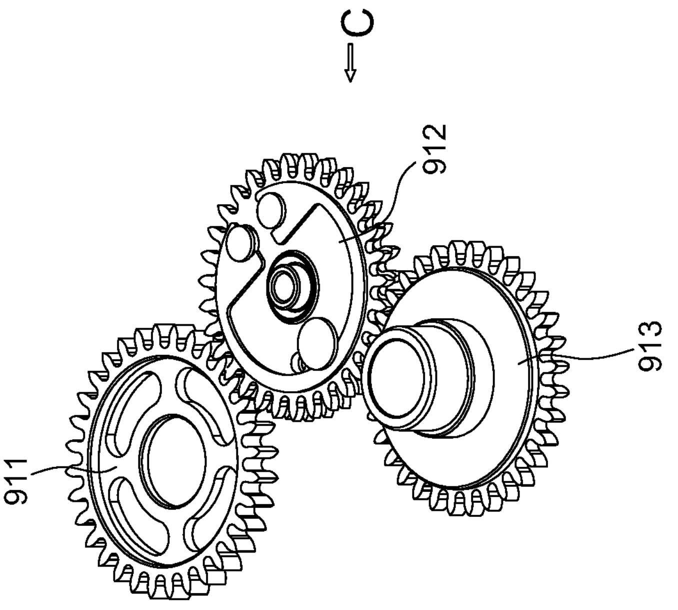
Figure 34:
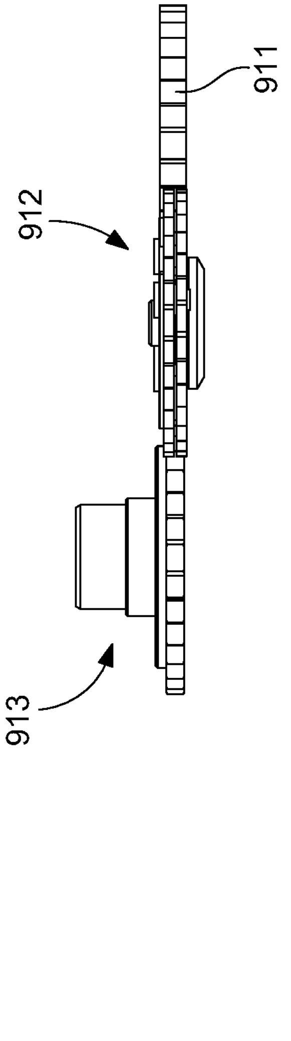
Figure 51:
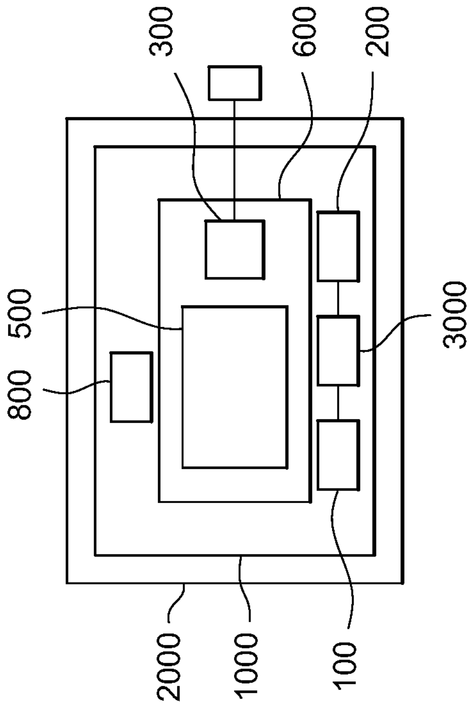

- the rotation compensating mechanism of FIGS. 22 to 25 comprising the first freewheel wheel set and the second freewheel wheel set of FIGS. 46 to 49;
- the hour rotation decoupling mechanism of FIGS. 26 to 28, comprising a third freewheel wheel set meshing with a friction wheel set;
- the minute rotation decoupling mechanism of FIGS. 29 to 31, comprising a fourth freewheel wheel set meshing with a friction wheel set;
- the transfer train of the hour display of FIGS. 32 to 34;

FIG. 51 is a block diagram showing a timepiece, in particular a watch, comprising a mechanism according to the invention, comprising at least one such horological mechanism, which comprises a structure carrying the switching and coupling mechanism as well as the control means, which comprises a control member that can be operated by the user. This horological mechanism comprises energy storage means, which are arranged to supply energy to the first mechanism and/or second mechanism. In this case, the third mechanism is the display mechanism.

DETAILED DESCRIPTION OF THE INVENTION

The invention relates to the production of a horological switching mechanism, and more particularly a switchable display mechanism for a timepiece, in particular but not limited to a watch.

More particularly, the invention relates to a horological mechanism 1000, which comprises a first mechanism 100, in particular but not limited to a first train, comprising a first output wheel set 101 capable of pivoting, and a second mechanism 200, in particular but not limited to a second train, comprising a second output wheel set 102 capable of pivoting.

The position of the first output wheel set 101 is associated with a first input variable, and the position of the second output wheel set 102 is associated with a second input variable.

This first mechanism 100 and this second mechanism 200 are arranged to control, each in turn, the motion of a third mechanism, and the driving of at least a third output wheel set comprised in this third mechanism. In the example shown in the figures, this third mechanism is a display mechanism capable of displaying the value of the first input variable, or of the second input variable, according to a selection made by the user.

More particularly, this first mechanism 100 and this second mechanism 200 operate continuously, independently of one another in terms of their operation, although they can, for example, be powered by a single energy source.

According to the invention, this horological mechanism 1000 comprises a switching and coupling mechanism 500, which is arranged for the alternating and exclusive coupling between, on the one hand, the first mechanism 100 or the second mechanism 200, which constitute two inputs each more particularly operating continuously, and on the other hand, the third mechanism constituting an output.

This horological mechanism 1000 further comprises a control means 300 that can be operated by a user to uncouple the mechanism from among the first mechanism 100 and second mechanism 200 that is engaged with the third mechanism, and to engage the other from among the first mechanism 100 and second mechanism 200 with this third mechanism. The switching and coupling mechanism 500 comprises mechanical means for coupling, in a single angular position per revolution, on the one hand the first mechanism 100 or said second mechanism 200, and on the other hand said third mechanism, said mechanical coupling means allowing for coupling solely in said single angular position.

More particularly, this switching and coupling mechanism 500 comprises two input wheel sets 1, 2, each constituted by an output wheel set 101, 102, or driven directly by an output wheel set 101, 102. This switching and coupling mechanism 500 comprises a sliding wheel set 5, 935, 936, which is capable of moving axially, in particular on a coupling arbor 937, 938, in the first direction D1, and under permanent strain between the two input wheel sets 1, 2.

This sliding wheel set 5, 935, 936 is arranged to cooperate alternately and exclusively, by frontal clicking in a single angular position per revolution, with either one of the two input wheel sets 1, 2, selected under the action of a command imparted by a user to the control means 300, to establish a driving connection between, on the one hand, the input wheel set 1, 2, which is engaged with the sliding wheel set 5, 935, 936 at the given moment in time, and, on the other hand, this at least one third output wheel set in order to cause it to pivot by a stroke that is characteristic, depending on the case, of the first input variable or of the second input variable.

More particularly, but in a non-limiting manner, this third mechanism is a display mechanism for the respective display, on demand, on at least one display means, of a first or of a second indication specific to the first mechanism, and to the second mechanism respectively. The horological mechanism 1000 thus comprises such a switching and coupling mechanism 500 for producing a switchable display, the third output wheel set being a display means 800, 8, 28.

More particularly, the output wheel sets 101 and 102 are arranged to control the respective display, on at least one display means 800, 8, 28, and on demand, of a first or of a second indication specific to the first mechanism 100 and to the second mechanism 200 respectively.

By pure convention, the first mechanism 100 is referred to as the "upper" mechanism and the second mechanism 200, in particular the two horological movements, or the two trains, or other elements to be switched, is referred to as the "lower" mechanism.

The invention is described for the specific and non-limiting case of switching a minute display, and for switching an hour display, these names being used to distinguish between the numerous components. It goes without saying that the invention is also applicable to the switching of the display of other horological variables, or to a switching mechanism for the transmission of a force, a command, or the like, the display being a specific, non-limiting example.

Figure 2:
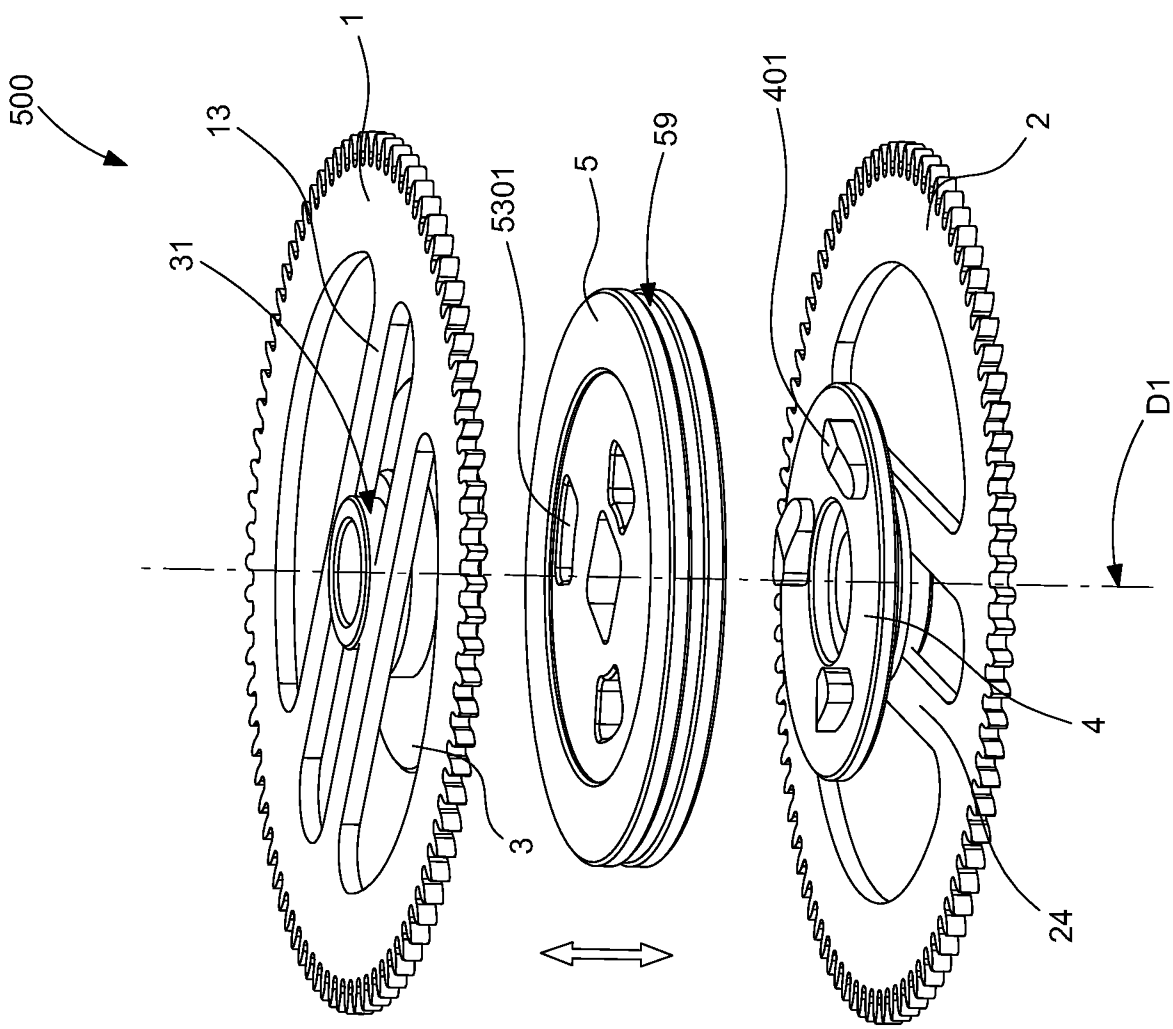
FIG. 2 diagrammatically shows a perspective view of a part of a switching and coupling mechanism, this part constituting a switching unit with two input wheel sets, both of which are coaxial on a coupling arbor (not shown), each driving, by friction, a coupling wheel comprising a coupling relief, which coupling wheels frame a sliding wheel set which comprises, on each face, a complementary coupling relief which is arranged to cooperate, in a single angular position, with the coupling relief of the coupling wheel with which this sliding wheel set is engaged at a given moment in time; this sliding wheel set comprises a female square, allowing it to slide axially on an arbor with which it rotates as one; the sliding wheel set comprises an external groove allowing an external element such as a spring strip or a control lever to exert an axial, descending or ascending force depending on the desired switching with the upper or lower coupling wheel in the figure.

More particularly, to display a first function, for example the display of the minutes and as seen in FIG. 2, the sliding wheel set is a first sliding wheel set 5, 935 and the two input wheel sets 1, 2 are coaxial about a first slide axis D1. The first sliding wheel set 5 is arranged to be axially coupled, either directly or indirectly, with only one of the two input wheel sets 1, 2 at a time, by the cooperation of complementary reliefs in a single relative angular position per revolution for each input wheel set 1, 2.

The first sliding wheel set 5 comprises an external groove 59 allowing an external element such as a spring strip 934, or a control lever, comprised in the control means 300, to exert an axial, downwards or upwards force depending on the desired switching with an upper coupling wheel 3 or lower coupling wheel 4. The first sliding wheel set 5 is held in its coupling position by at least one such spring strip 934, or one such lever. More particularly, a spring strip 934 is arranged to control the axial positioning, and then to maintain the axial position, of the first sliding wheel set 5, 935. This control means 300 is further arranged to impart rotational travel to the first sliding wheel set 5, 935, to find the first coupling position between the first sliding wheel set 5, 935 and the wheel set towards which it is pushed. Similarly, the same spring strip 934, or another spring strip similarly controlled by the control means 300, can control the axial motion of another sliding wheel set. FIGS. 3 to 50 show the preferred case where the same spring strip 934 controls the simultaneous motions of a first sliding wheel set 935 and of a second sliding wheel set 936.

More particularly, each sliding wheel set 5, 935, 936, is a coaxial sliding coupling sleeve. FIG. 2 shows a first sliding wheel set 5 for managing the minute display, which sliding wheel set is such a coaxial sliding coupling sleeve for the coupling with, on the one hand, a lower minute coupling wheel 3 frictionally driven by the first input wheel set 1, in particular by means of resilient arms 13, and, on the other hand, an upper minute coupling wheel 4 frictionally driven by the second input wheel set 2, in particular by means of resilient arms 24. Moreover, the first input wheel set 1, or respectively the second input wheel set 2, is arranged to drive the lower minute coupling wheel 3, or respectively the upper minute coupling wheel 4.

This lower minute coupling wheel 3 and this upper minute coupling wheel 4 respectively comprise a first coupling element, not shown in FIG. 2, and a second coupling element 401, which are arranged to cooperate alternately in the coupling position, one at a time, with a first complementary coupling element 5301 or with a second complementary coupling element, not shown in FIG. 2, comprised in the sliding wheel set concerned, in this case the first sliding wheel set 5.

Moreover, the control means 300 is arranged to impart axial travel to this first sliding wheel set 5 as far as abutment against the lower minute coupling wheel 3 or respectively against the upper minute coupling wheel 4, and to impart rotational travel to the first sliding wheel set 5, to find the first coupling position between the first sliding wheel set 5 and the lower minute coupling wheel 3, or respectively the upper minute coupling wheel 4, towards which it is pushed. In the case shown in FIGS. 3 to 50, the first sliding wheel set 935 and the second sliding wheel set 936 are arranged in the same way, each sliding on its respective arbor 937 and 938.

It is understood that the axial sliding motion of each sliding wheel set on its respective arbor towards the coupling position takes place in two stages: firstly, the spring strip exerts a force on the sliding wheel set to bring it into a position wherein it axially bears against the reliefs of one of the coupling wheels, then, during the relative rotation of this sliding wheel set and this coupling wheel, these two wheel sets reach the single angular coupling position wherein the respective male and female reliefs thereof cooperate, in order to authorise the end of the axial travel corresponding to the coupling of the sliding wheel set fully engaged in the coupling wheel concerned. When uncoupling, axial bearing in the opposite direction imparted by the spring strip allows the sliding wheel set to be extracted and to travel towards the other coupling wheel, and the sliding wheel set travels off-load between its path of extraction from an upper coupling wheel and its path to the lower coupling wheel for the bearing and insertion thereof, or vice versa.

Various alternative embodiments are described hereinbelow as regards the arrangement of the first sliding wheel set 5, 935, and are applicable to the second sliding wheel set 936, or to any other similar sliding wheel set that may be comprised in the switching and coupling mechanism 500.

More particularly, the switching and coupling mechanism 500 comprises at least one resilient return means which is arranged to axially push the first sliding wheel set 5, 935 to abut against the lower minute coupling wheel 3, or respectively the upper minute coupling wheel 4, towards which it is pushed.

More particularly, the first coupling element and the second coupling element are respectively a first claw element and a second claw element, which are arranged to alternately cooperate in a clawing position, one at a time, with the first complementary coupling element or with the second complementary coupling element, which are respectively a first complementary claw element and a second complementary claw element.

More particularly, the control means 300 is arranged to impart rotational travel to an intermediate wheel integral with the first sliding wheel set 5, 935 for rotation therewith, to find a coupling position between the first sliding wheel set 5, 935 and the lower minute coupling wheel 3 or the upper minute coupling wheel 4 towards which it is pushed.

More particularly, the first sliding wheel set 5, 935 comprises, on a first face facing the lower minute coupling wheel 3, and on a second face facing the upper minute coupling wheel 4, at least one post, or respectively one slot, which is arranged to cooperate in a complementary manner with a slot, or respectively a post, comprised in the lower minute coupling wheel 3, and respectively the upper minute coupling wheel 4, in a single cooperation position during a relative rotation of less than or equal to 360°, during the rotational travel of the first sliding wheel set 5, 935.

More particularly, the first sliding wheel set 5, 935 is mounted such that it slides on a first coupling arbor 937 with which it is rotationally indexed, which first coupling arbor 937 is arranged to cause, either directly or indirectly, a display means 800, 8, 28 to rotate.

More particularly, this first coupling arbor 937 is arranged to cause a display means 800, 8, 28 to rotate, through a train incorporating the intermediate wheel, or through the intermediate wheel, which is rotationally indexed with the first coupling arbor 937.

More particularly, the first output wheel set 101 and the second output wheel set 102 are in constant rotation.

The invention can be used to display all kinds of variables.

More particularly, the first output wheel set 101 and the second output wheel set 102 are arranged to control the respective display, on at least one display means 800, 8, 28, of a first indication and a second indication, which are time indications.

One non-limiting example application of the invention is described hereinbelow for the display of two distinct time indications on the same display medium 800, in this case comprising an hour hand 28 and a minute hand 8.

More particularly, the first mechanism, in particular a first train, 100 is driven by a first regulating member 1100, the second mechanism, in particular a second train, 200 is driven by a second regulating member 1200, and this first regulating member 1100 and this second regulating member 1200 are arranged to operate continuously, independently or not independently of one another, and without user intervention, for the respective display of a first and of a second time indication, and respectively comprise a first input wheel set 1 and a second input wheel set 2 which are in constant rotation.

More particularly, this first regulating member 1100 and this second regulating member 1200 are regulated in different ways. In one specific case, the first regulating member 1100 is regulated to display a first time, and the second regulating member 1200 is regulated to display a second time. The control means 300 allows the user to display the time at will according to the first time or according to the second time, and the mechanism according to the invention allows the countdown of that of the two times not being displayed at the given moment in time to continue.

Figure 35:
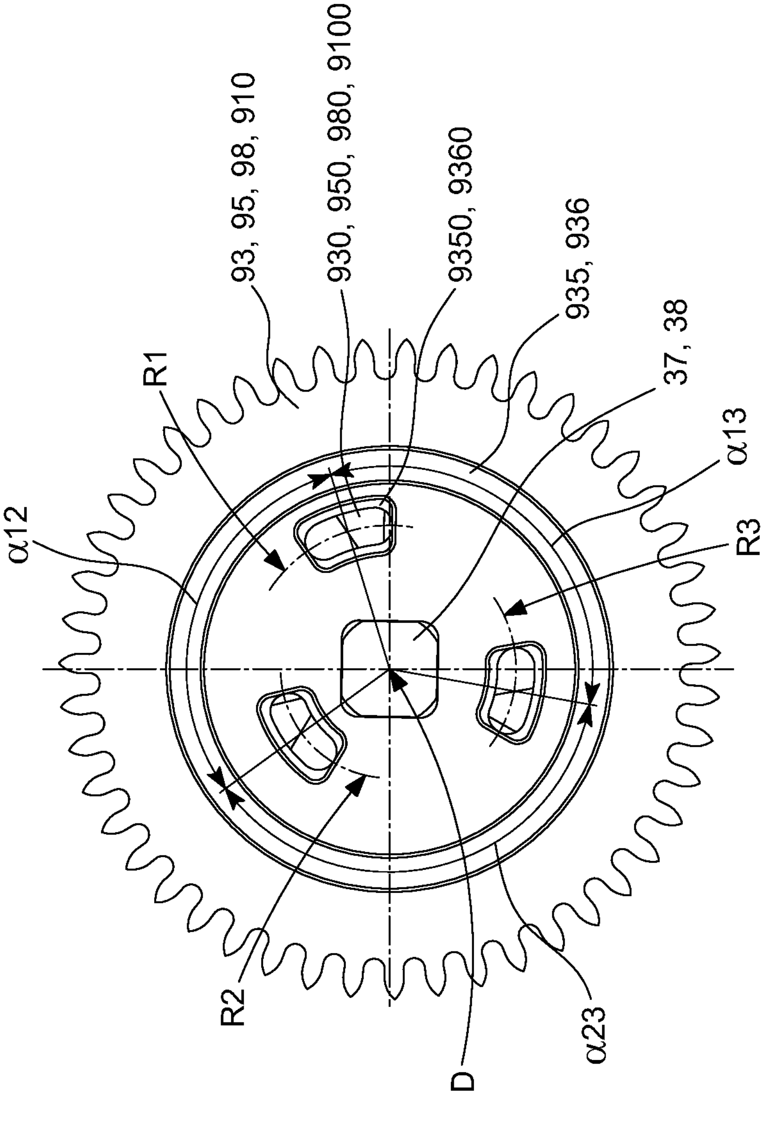

FIG. 2 thus shows the switching and coupling mechanism 500 for the above example: the first mechanism, in particular a first train, 100, dedicated to the first so-called "lower" time, drives a first input wheel set 1 which is a first lower minute wheel; the second mechanism, in particular a second train, 200, dedicated to the second so-called "upper" time, drives a second input wheel set 2 which is a second upper minute wheel. The first input wheel set 1 is frictionally connected to the lower minute coupling wheel 3, and the second input wheel set 2 is frictionally connected to an upper minute coupling wheel 4. The lower minute coupling wheel 3 and the upper minute coupling wheel 4 respectively comprise a first coupling element and a second coupling element, in this case formed by projections extending in a direction parallel to the first slide axis D1, and distributed over different diameters, as shown in FIG. 35; the distal part of these projections is sloping or radiating, to facilitate cooperation with the slots in the first sliding wheel set 5, 935. These slots, which project in a plane perpendicular to the axis D1 complementary to the projections, constitute the first complementary coupling element and the second complementary coupling element. These slots can, of course, be coincident, on the two faces of the first sliding wheel set 5, 935, in order to simplify the manufacturing process. The interlocking cooperation between the lower minute coupling wheel 3, or respectively the upper minute coupling wheel 4, with the first sliding wheel set 5, 935, is only possible in a single position per 360° revolution, as shown in FIG. 35, after the sliding wheel set has been placed such that it abuts against the coupling wheel concerned.

The axial support in the direction of the first slide axis D1 is easy to produce: the first sliding wheel set 5, 935 is capable of moving on the first coupling arbor 937 according to a first square profile. In an alternative embodiment, the first coupling arbor 937 carries an intermediate wheel, which is thus integral with the first sliding wheel set 5, 935 for rotation therewith. This intermediate wheel meshes with a cannon-pinion 8, pivoting about a minute display axis. The first sliding wheel set 5, 935 thus ensures the coupling between this cannon-pinion 8 and the lower minute coupling wheel 3 or upper minute coupling wheel 4, corresponding to the minute wheel 1 or 2, depending on the time information to be displayed.

However, the axial support alone is not sufficient, since the angular position of alignment between the first sliding wheel set 5, 935, and the lower minute coupling wheel 3 or upper minute coupling wheel 4 corresponding to the display to be produced must be found: thus, the coupling can only be produced between the mechanisms concerned.

To this end, the control means 300 comprises means for driving the first sliding wheel set 5, 935 such that it rotates, which means are arranged to impart thereto a rotation relative to the lower minute coupling wheel 3, or respectively the upper minute coupling wheel 4, towards which it is axially pushed, in order to find the single position of alignment over a rotation of less than or equal to 360°. The figures show a non-limiting example embodiment that is characterised by a small thickness, which is advantageous in order to integrate other complications in the timepiece 2000, which is in particular a watch.

The figures show the extension of the above principle, to allow a plurality of time variables to be displayed on the basis of the minute display by a minute switching unit, and the hour display by an hour switching unit. In one specific embodiment, the switching and coupling mechanism 500 is arranged to enable the hour display to be switched, and comprises two secondary input wheel sets. A second sliding wheel set 936 is capable of moving axially on a second coupling arbor 938 under constant strain between these two secondary input wheel sets.

More particularly, the second sliding wheel set further comprises a groove, and the two secondary input wheel sets are coaxial around a second secondary slide axis. More particularly, the second sliding wheel set is a coaxial sliding coupling sleeve, for coupling on the one hand with a lower hour coupling wheel frictionally driven by the first secondary input wheel set, and on the other hand, an upper hour coupling wheel frictionally driven by the second secondary input wheel set, and the first secondary input wheel set or respectively the second secondary input wheel set is arranged to drive the lower hour coupling wheel, or respectively the upper hour coupling wheel. All of the components of this set dedicated to switching the hour display are similar to those of the minutes.

The connection between the minute switching unit and the hour switching unit can be achieved by adding, to the minute switching unit, intermediate transfer wheels which are integral with the lower minute coupling wheel 3 and with the upper minute coupling wheel 4 respectively, and transition wheels, which engage the lower hour coupling wheel and the upper hour coupling wheel respectively. The second coupling arbor, which is the hour coupling arbor, carries a secondary intermediate wheel, held by a secondary screw, and which engages an hour wheel, which is in particular coaxial with the cannon-pinion. In the non-limiting embodiment, the spring strip 934 is a Y-shaped fork, and each of its legs act on the corresponding first sliding wheel set 5, 935, or the corresponding second sliding wheel set 936.

This lower minute coupling wheel 3 and this upper minute coupling wheel 4 respectively comprise a first coupling element, and a second coupling element, which are arranged to cooperate alternately in the coupling position, one at a time, with a first complementary coupling element or with a second complementary coupling element, comprised in the sliding wheel set.

Moreover, the control means 300 is arranged to impart axial travel to the first sliding wheel set 5, 935 as far as abutment against the lower minute coupling wheel 3 or respectively against the upper minute coupling wheel 4, and to impart rotational travel to the first sliding wheel set 5, 935, to find the first coupling position between the first sliding wheel set 5, 935 and the lower minute coupling wheel 3, or respectively the upper minute coupling wheel 4, towards which it is pushed.

More particularly, the switching and coupling mechanism 500 comprises at least one resilient return means, which is arranged to axially push the first sliding wheel set 5, 935 to abut against the lower minute coupling wheel 3, or respectively the upper minute coupling wheel 4, towards which it is pushed.

FIGS. 3 to 50 show in detail a specific and non-limiting embodiment of the invention.

The switchable display mechanism 1000 relates to the display of the time indications of two separate trains, in particular but not limited to two separate horological movements. These two separate trains are in constant operation. In a specific alternative embodiment, these trains operate independently of one another, and comprise separate regulating members. In another alternative embodiment, the second mechanism, in particular a second train, results from a reduction in the motions of certain wheel sets of the first mechanism, in particular a first train. The use of the switching mechanism makes it possible to display either of the time indications on demand at any time.

The mechanism consists essentially of the following functional units:

- two switchable vertical couplings (on the one hand for displaying the minutes and on the other hand for displaying the hours in the specific, non-limiting, embodiment shown in the figures);
- a train that can cause the two arbors of the vertical couplings to rotate;
- a mechanism that controls the disengagement/coupling and the transmission of the rotary motion.

Figure 3:
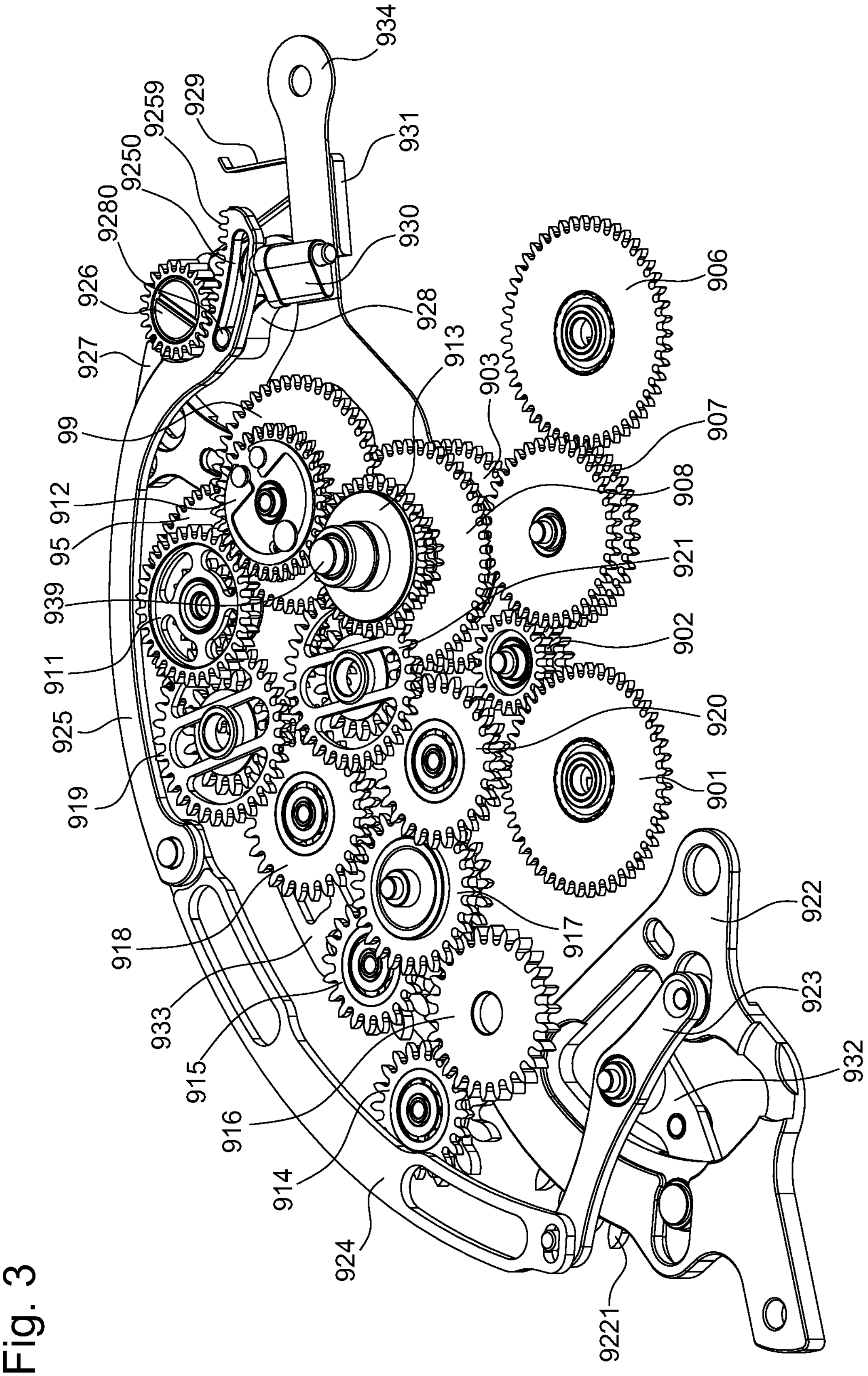
Figure 4:
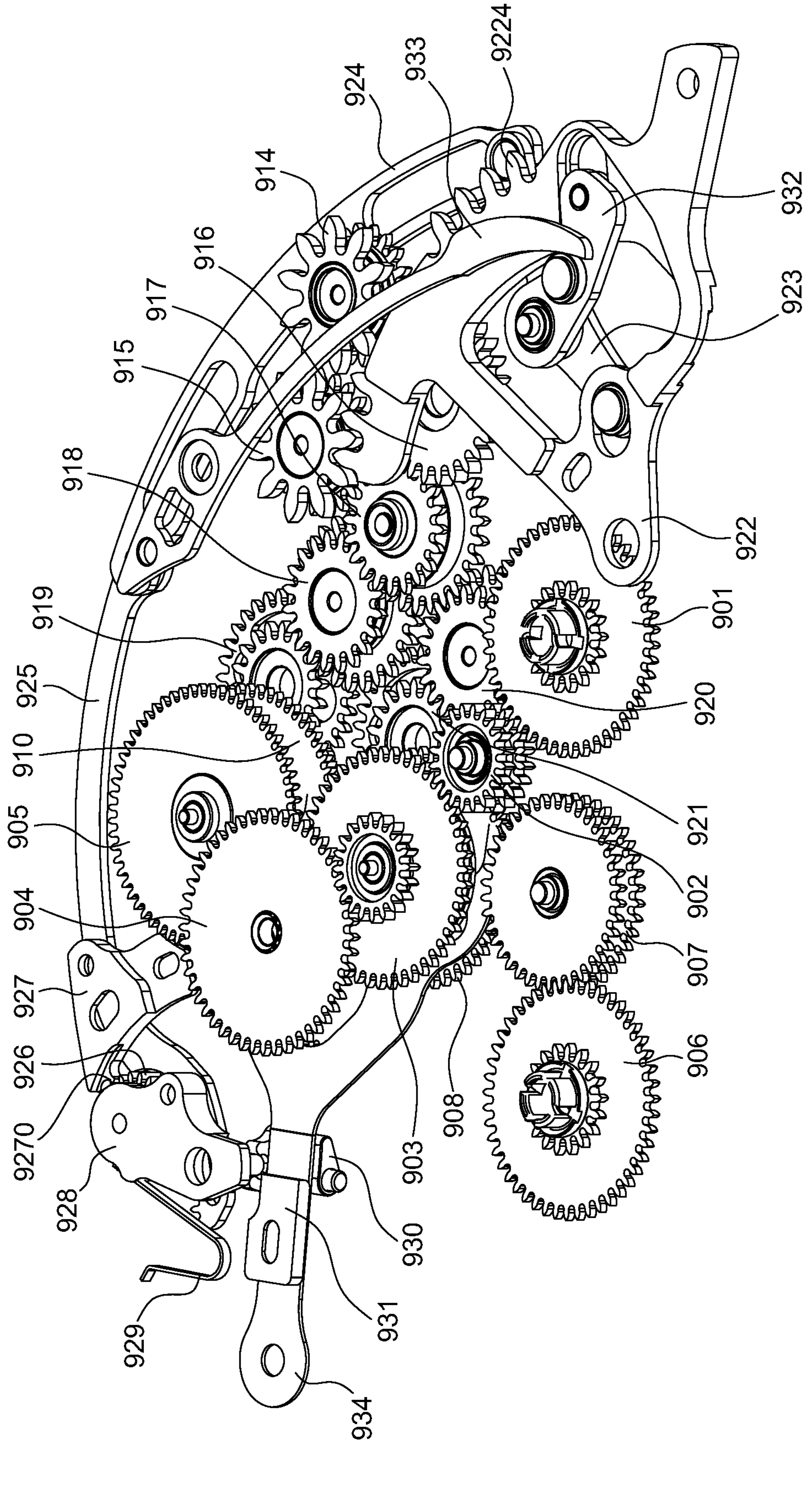

FIGS. 3 and 4 show the entire mechanism, from the dial side and from the bar side respectively.

Figures 5, 6, 7:
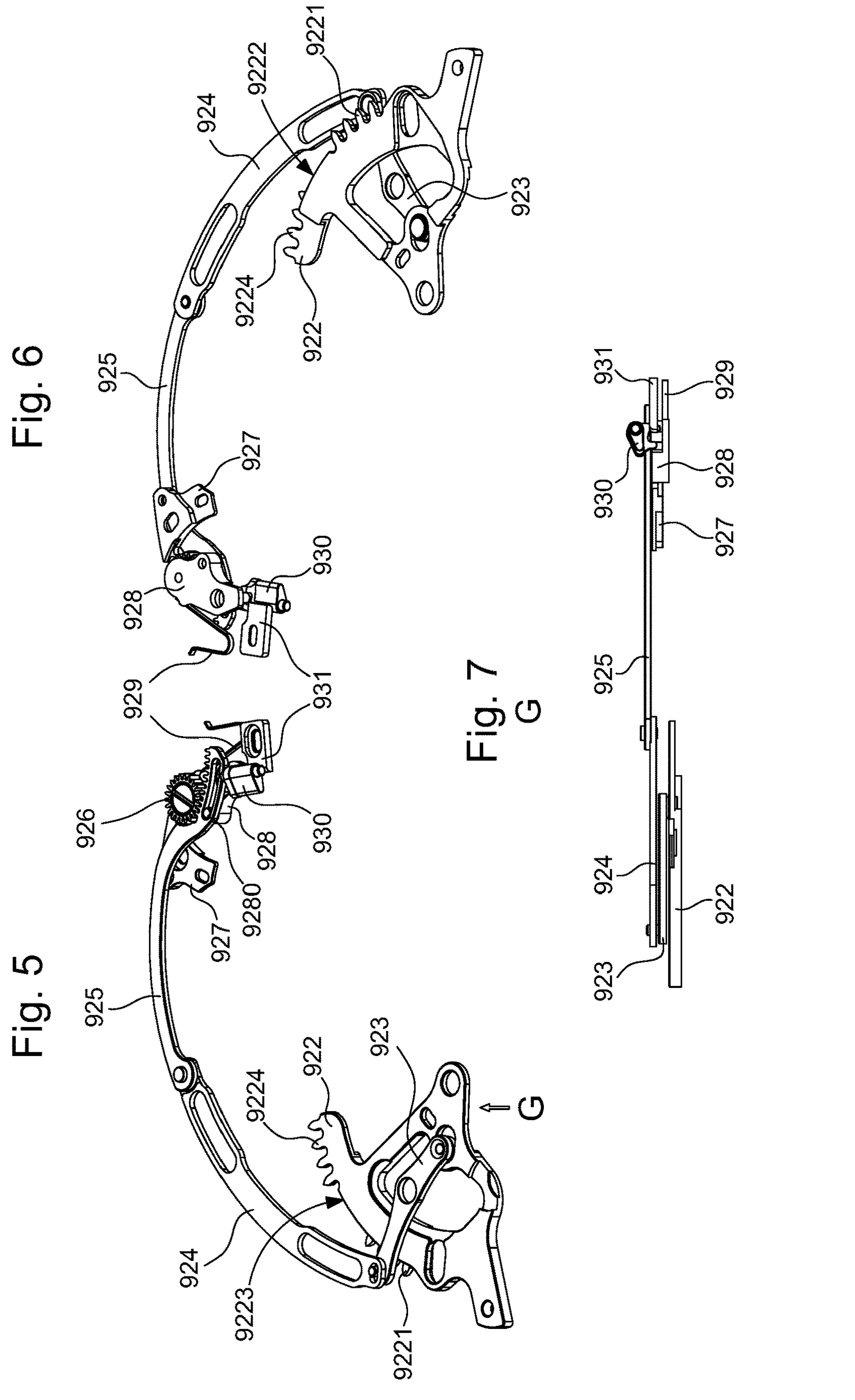

FIG. 5 represents a control mechanism 300, viewed from the dial side, comprising, between on the one hand, a user-operated control lever 922 with toothed sectors and which controls the rotary motion and the couplings, and on the other hand a pivoting flap 930 intended to bear against the spring strip 934 comprising at least one connecting fork 9345, 9346, arranged to cooperate with at least one sliding wheel set at a groove or similar element, in particular but not restrictively with a first sliding wheel set 935 and a second sliding wheel set 936, a succession of levers: a first lever 923, a second lever 924, a third lever 925, and a fourth lever 928, articulated to one another.

The third lever 925 transmits the rotary motion to a pinion 926 carried by the fourth lever 928.

The fourth lever 928 comprises a pin 9280 which slides into a slot 9250 in the third lever 925, and is subjected, in its plane, to the pressure of a lever spring 929. The pinion 926 cooperates or does not cooperate with a toothed sector 9259 of the front-fourth lever 925 and/or with a single tooth 9270 comprised in a fixed plate 927 which can be adjusted under the pressure of a lever spring 929, to cause the fourth lever 928 to rotate. The lever spring 929 cooperates such that it bears against a bearing support 931, which can be adjusted during assembly. This fourth lever 928 comprises a groove, respectively a finger, cooperating with a finger 9300, respectively a groove, of the pivoting flap 930, in order to cause the pivoting flap 930 to pivot about an axis parallel to the plane to which all of said levers are parallel, and thus to control the deformation and/or the motion of the spring strip 934.

Figure 46:
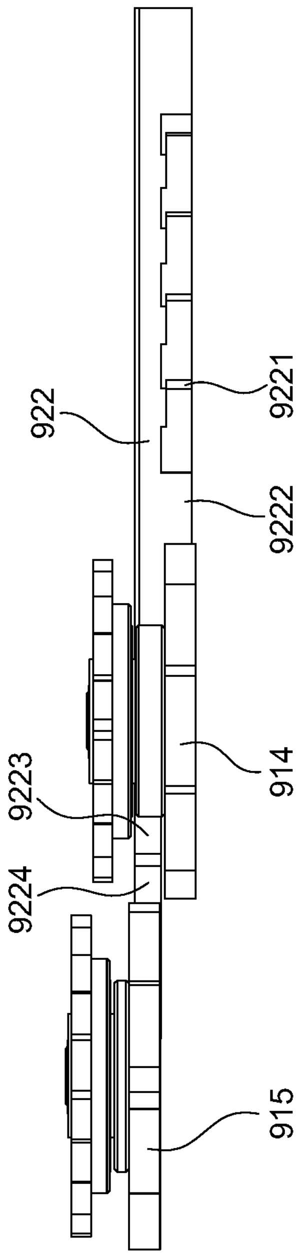
Figure 47:
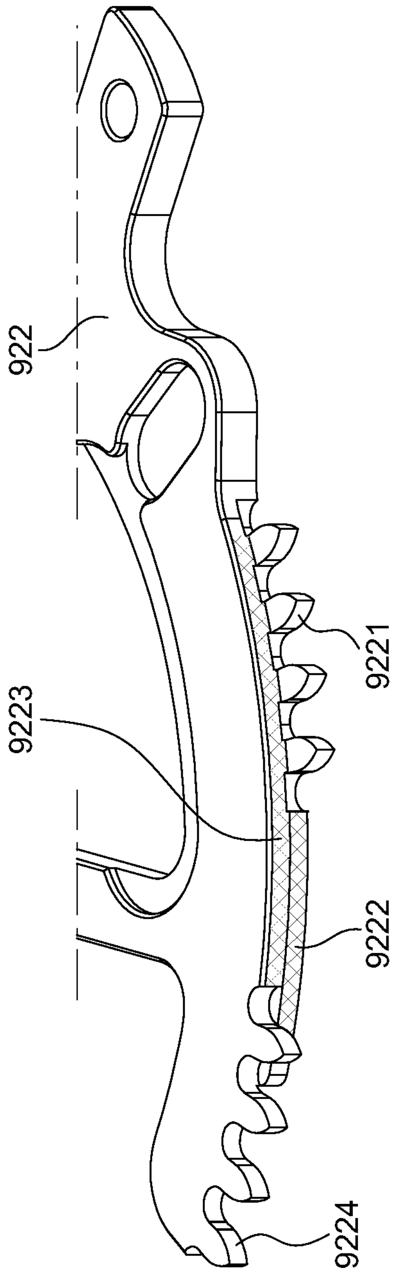

The control lever 922 comprises, on either side of its median plane, two toothed sectors 9224 and 9221, each extended by a cylindrical bearing surface 9223, 9222, the two cylindrical bearing surfaces being situated, when projected on this median plane, between the two toothed sectors, as shown in FIGS. 46 and 47.

FIG. 6, from the bar side, shows the cooperation between the fourth lever 928 and the pivoting flap 930. FIG. 7 shows the stack of levers, and the lever spring 929.

Figure 9:
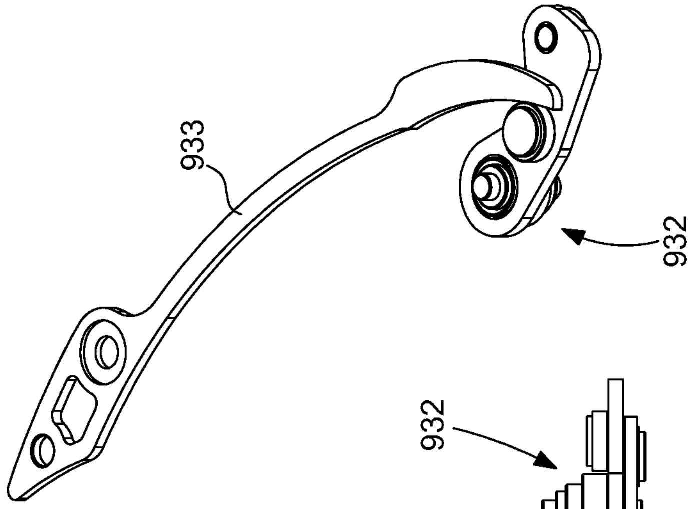
Figure 10:
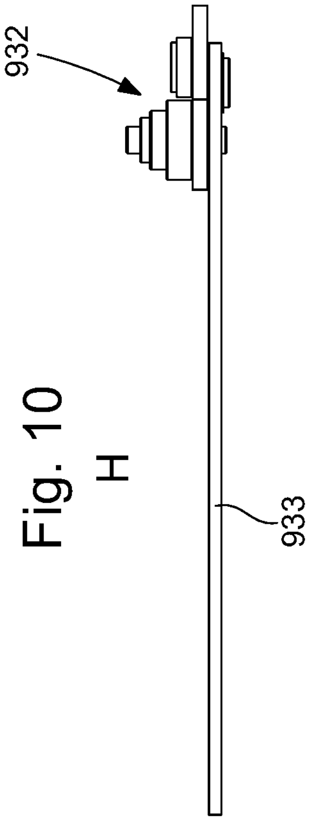
Figure 8:
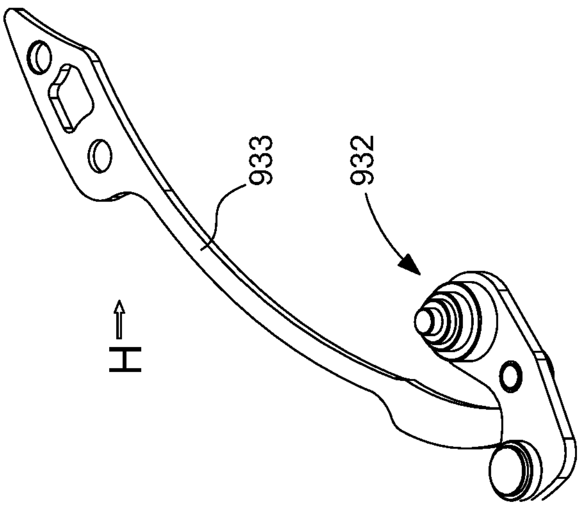

FIGS. 8 to 10 show a mechanism for returning to the rest position, comprising a return lever 932, which is articulated to the control lever 922 that guides it, and, bearing against a pin of this return lever 932, a return spring 933, which is very voluminous, of dimensions similar to those of the largest levers of the present mechanism, and which is very visible on the right-hand side of FIG. 27. This return spring 933 pushes the control lever 922 onto the return lever 932 in the final position, and constitutes a dead centre spring, as will be described hereinbelow.

Figure 12:
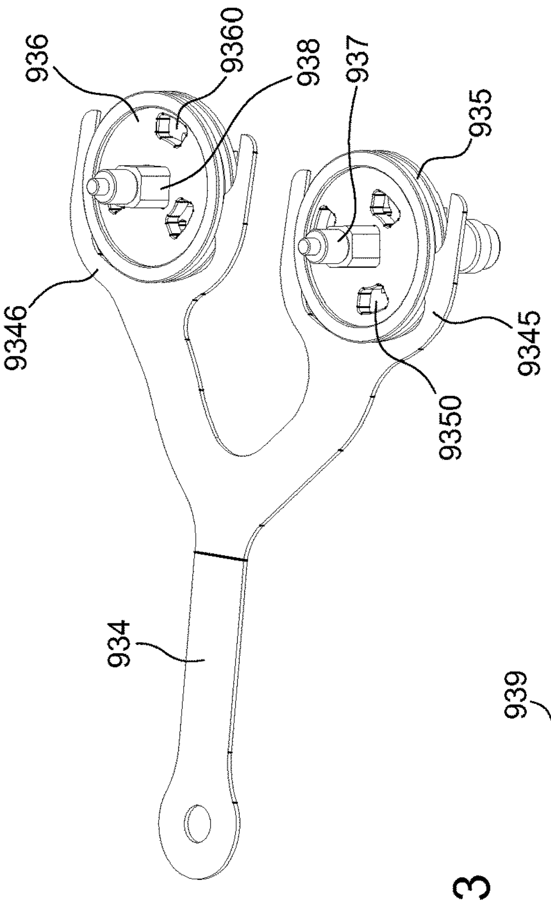
Figure 11:
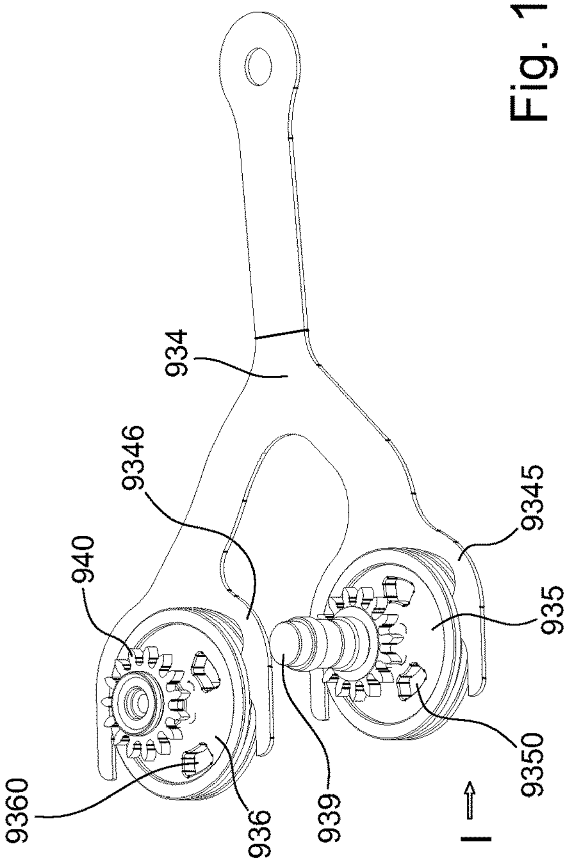
Figure 13:
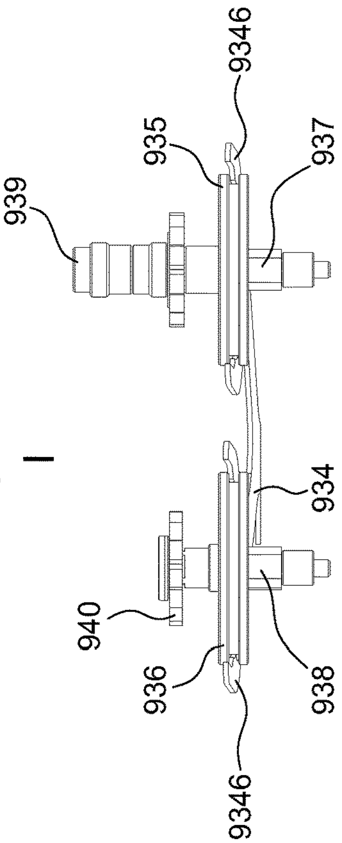

FIGS. 11 to 13 show the vertical coupling mechanism, which comprises the Y-shaped spring strip 934, comprising forks 9345 and 9346 for moving the first sliding wheel set 935 and the second sliding wheel set 936 on the respective minute coupling arbor 937 and hour coupling arbor 938. A cannon-pinion 939 on the minute coupling arbor 937 is intended to receive a minute display, whereas the hour coupling arbor 938 comprises an hour wheel 940 for displaying the time. Each sliding wheel set 935, 936 comprises slots 9350, 9360, intended for coupling with the protrusions 930, 980, 950, 9100 comprised in the input coupling wheels 93, 98, 95, 910.

Figure 14:
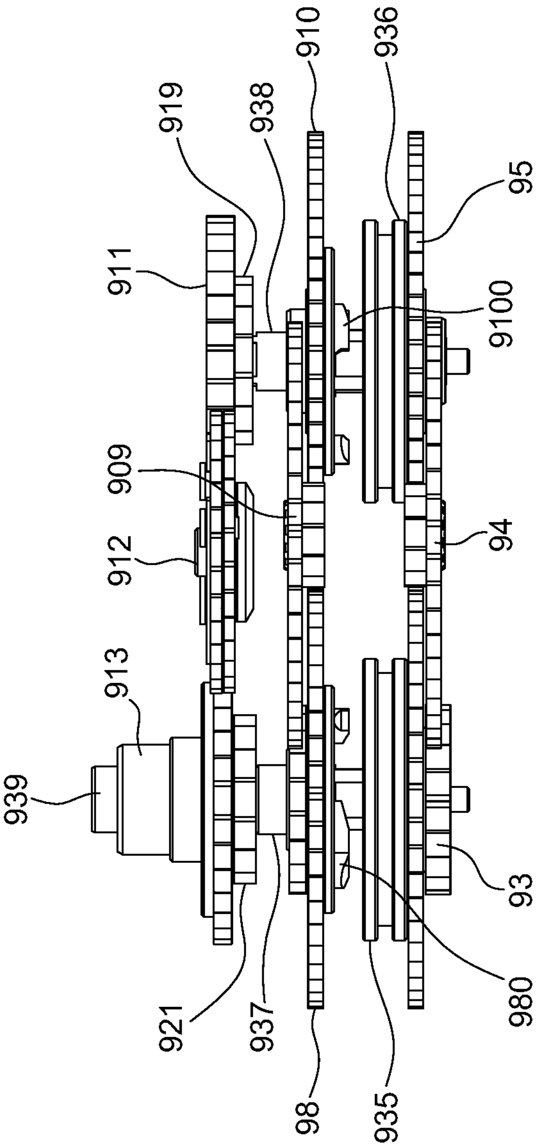
Figure 15:
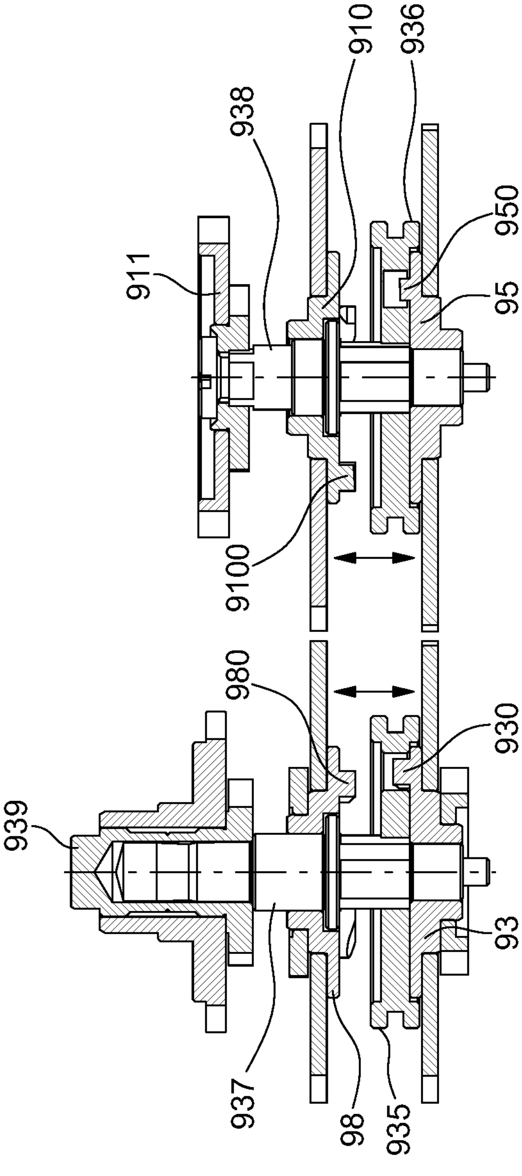

FIG. 14 shows the same vertical coupling mechanism, completed by various wheel sets belonging to various subassemblies which are, from bottom to top in the figure: the transfer train of the lower movement, the transfer train of the upper movement, and the transfer train of the hour display, the latter terminated by an hour wheel 913, which in this case is mounted coaxially to the cannon-pinion 939, without being limited thereto. FIG. 15 shows the same mechanism via a cross-section through the minute coupling arbor 937 and hour coupling arbor 938.

Figure 17:
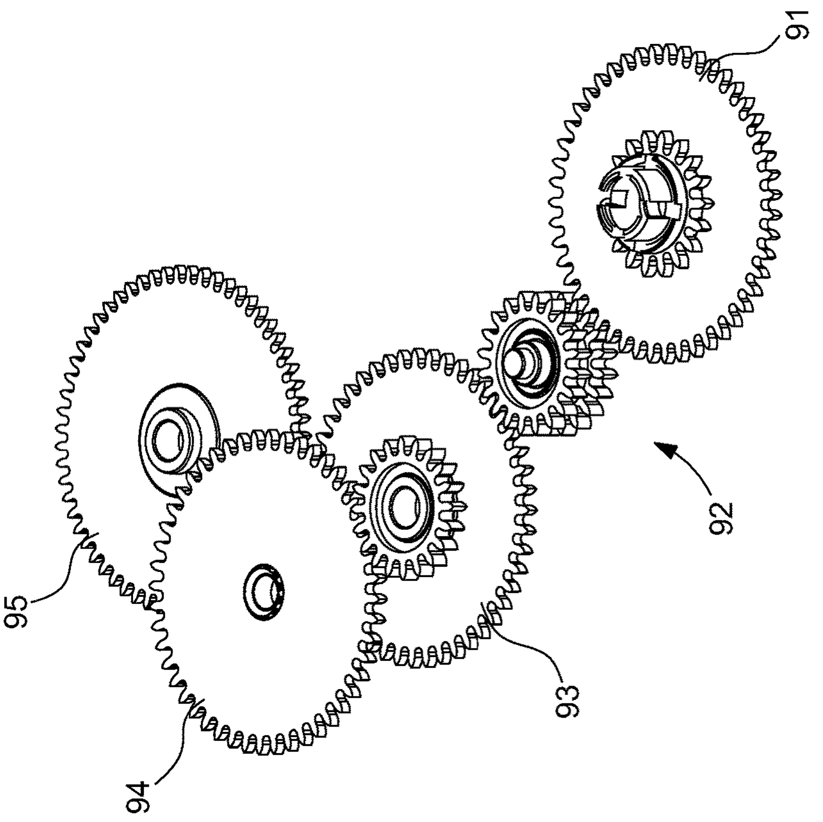
Figure 16:
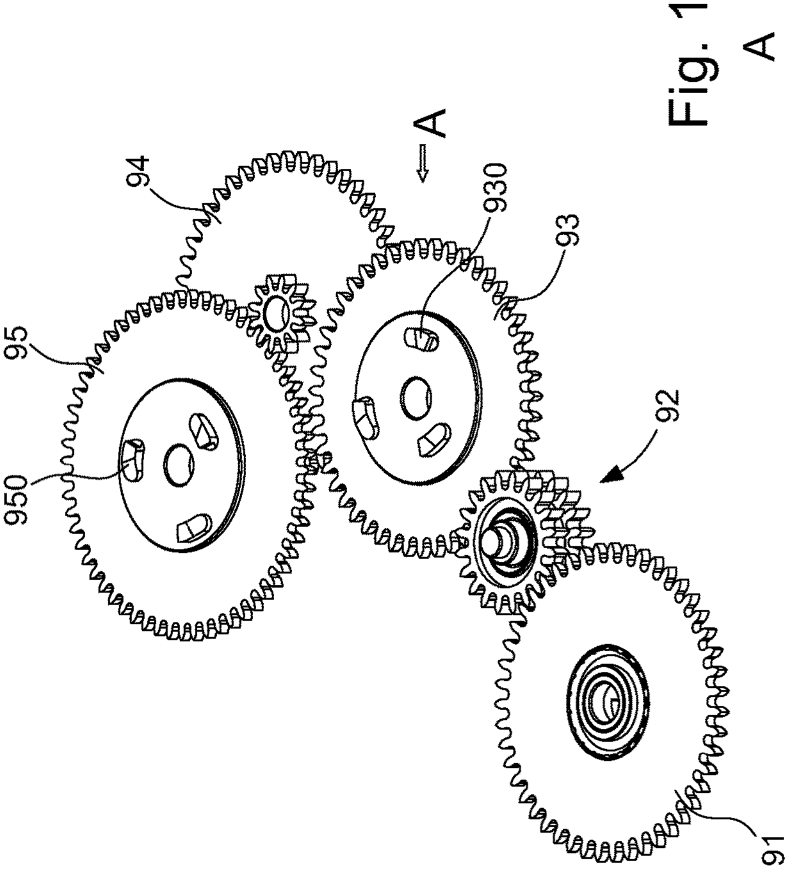
Figure 18:
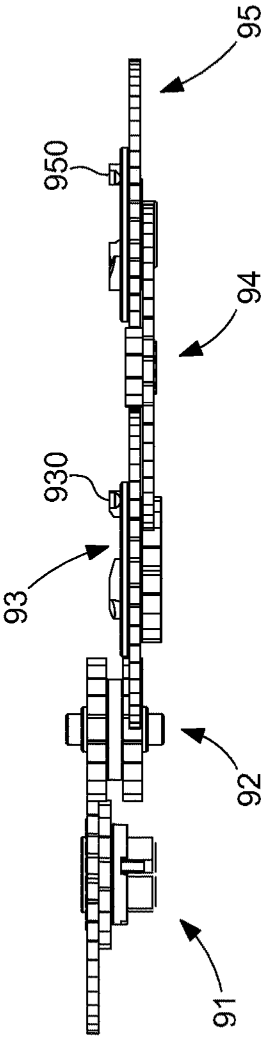

FIGS. 16 to 18 show the transfer train of the lower movement, which successively comprises a lower minute input wheel 91, comprising a friction-piece for adjusting the display, a lower reversing intermediate wheel 92, a lower minute coupling wheel 93, a lower reversing wheel 94, and a lower hour coupling wheel 95. The lower minute coupling wheel 93 and the lower hour coupling wheel 95 each comprise protrusions 930, 950, which are arranged to cooperate, in the coupling position, with these slots 9350, 9360 in the minute and hour coupling discs constituted by the sliding wheel sets 935 and 936.

Figure 20:
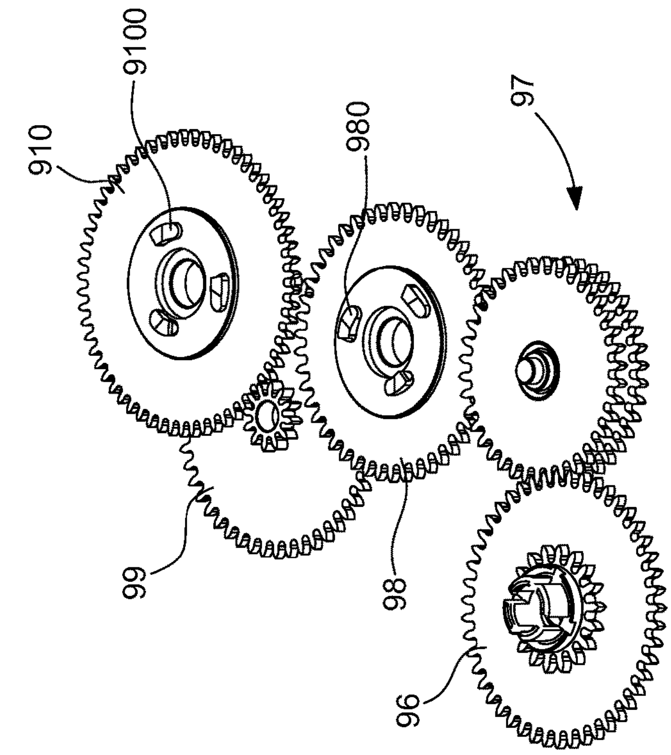
Figure 19:
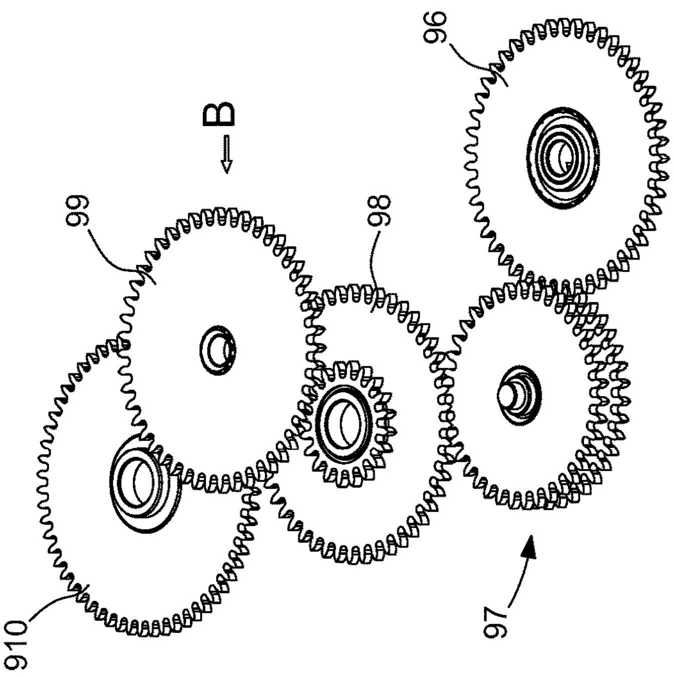
Figure 21:
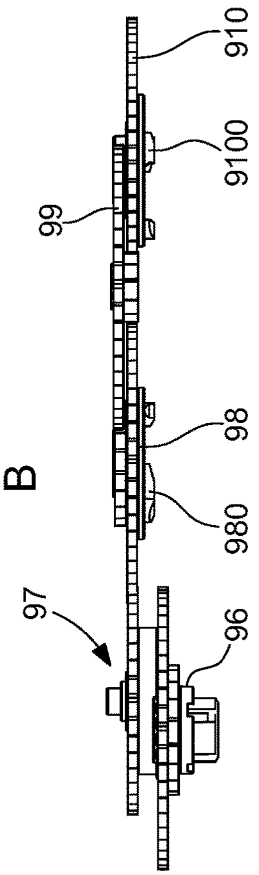
Figure 22:
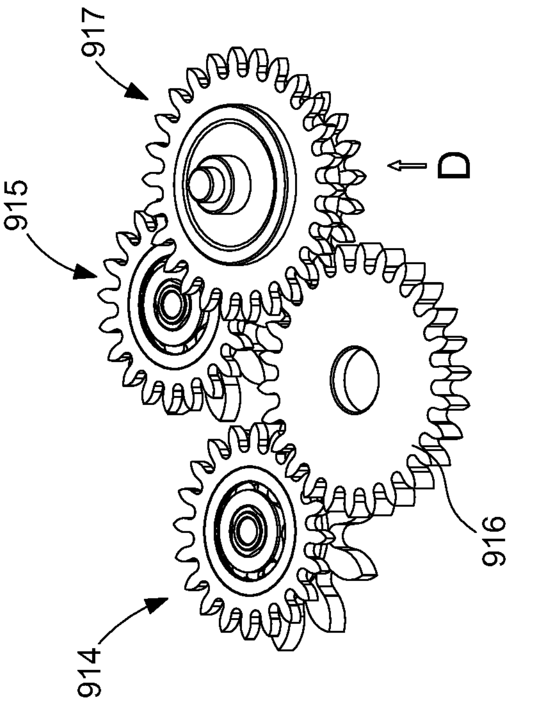
Figure 23:
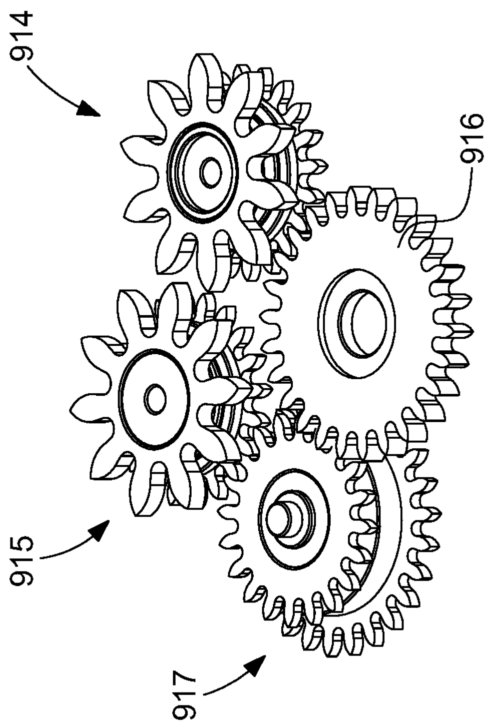
Figure 24:
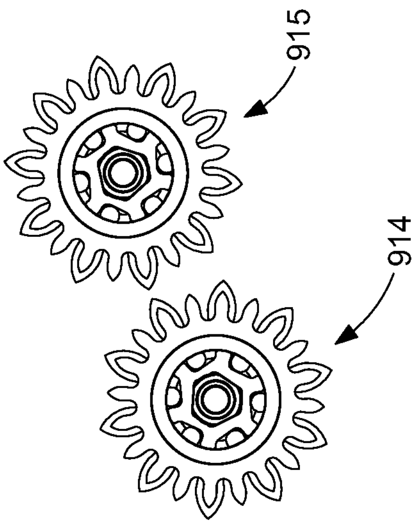
Figure 25:
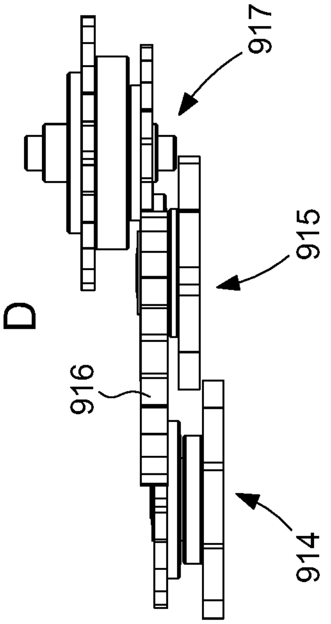

FIGS. 19 to 21 show the transfer train of the upper movement, which successively comprises an upper minute input wheel 96, comprising a friction-piece for adjusting the display, an upper reversing intermediate wheel 97, an upper minute coupling wheel 98, an upper reversing wheel 99, and an upper hour coupling wheel 910. The upper minute coupling wheel 98 and the upper hour coupling wheel 910 each comprise protrusions 980, 9100, which are arranged to cooperate with the slots 9350, 9360 in the minute and hour coupling discs.

FIGS. 22 to 25 show a rotation compensating mechanism comprising a first freewheel wheel set 914, which is free in the clockwise direction, and a second freewheel wheel set 915 which is blocking in the opposite direction to the first, connected to one another by a first intermediate wheel 916 and by a second intermediate wheel 917.

FIGS. 26 to 28 show an hour rotation decoupling mechanism, comprising a third freewheel wheel set 918, which decouples the switching motion under normal running, meshing with a third hour friction wheel set 919, which compensates for the remaining rotary motion after coupling.

FIGS. 29 to 31 show a minute rotation decoupling mechanism, comprising a fourth freewheel wheel set 920, which decouples the switching motion under normal running, meshing with a fourth minute friction wheel set 921, which compensates for the remaining rotary motion after coupling.

FIGS. 32 to 34 show the transfer train of the hour display visible in the top part of FIGS. 14 and 15, and which comprises a first hour transfer wheel 911, integral with the hour arbor 938 such that it rotates therewith, downstream of the hour rotation decoupling mechanism, and which meshes with an hour transfer intermediate wheel 912, with an integrated spring to compensate for play in the toothing, in order to drive an hour wheel 913 mounted coaxially to the cannon-pinion 939 on the minute shaft.

FIG. 35 shows a superimposed presentation of the configuration of the single cooperation position per revolution between the protrusions 930, 950, 980, 9100, of the minute and hour wheels on the one hand, and the slots 9350, 9360, of the minute and hour coupling discs 935 and 936 on the other. In this case, the protrusions and slots are distributed over three radii R1, R2, R3, of different values. Advantageously the angular positions are not at equal distance from one another, and the angles $\alpha\mathbf{12}$, $\alpha\mathbf{13}$ and $\alpha\mathbf{23}$ are different from one another.

FIGS. 36 to 50 show the main steps of the operation of switching from the time information of the upper movement to that of the lower movement, with this second embodiment of the invention.

Figure 37:
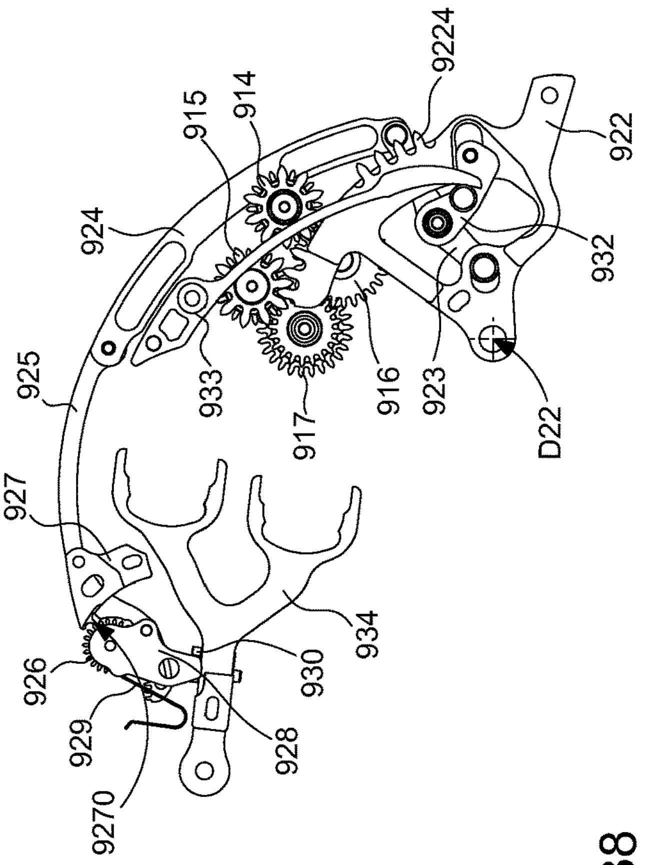
Figure 36:
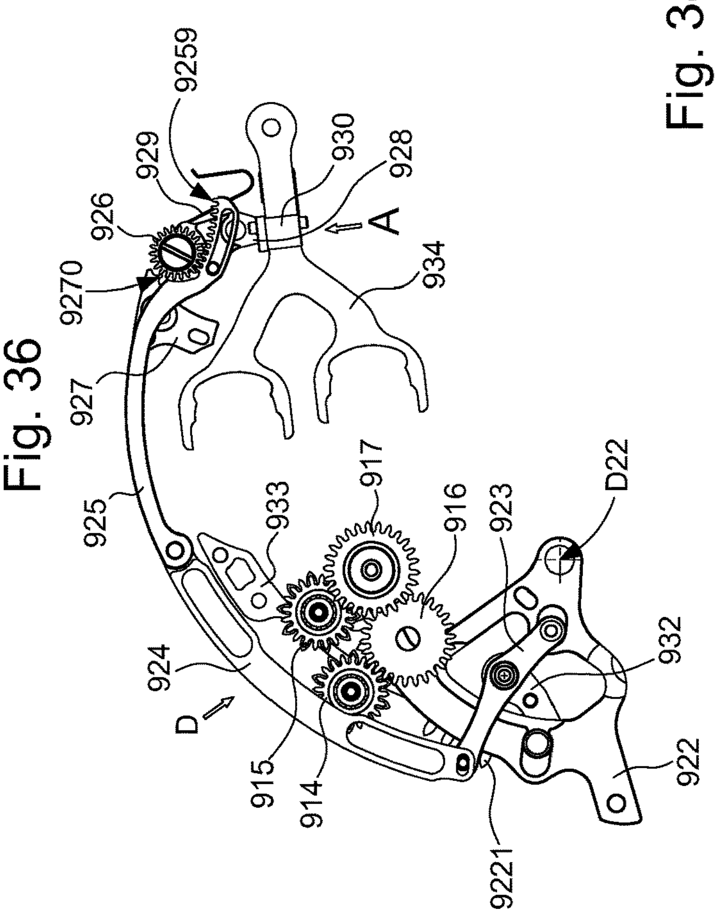
Figure 38:
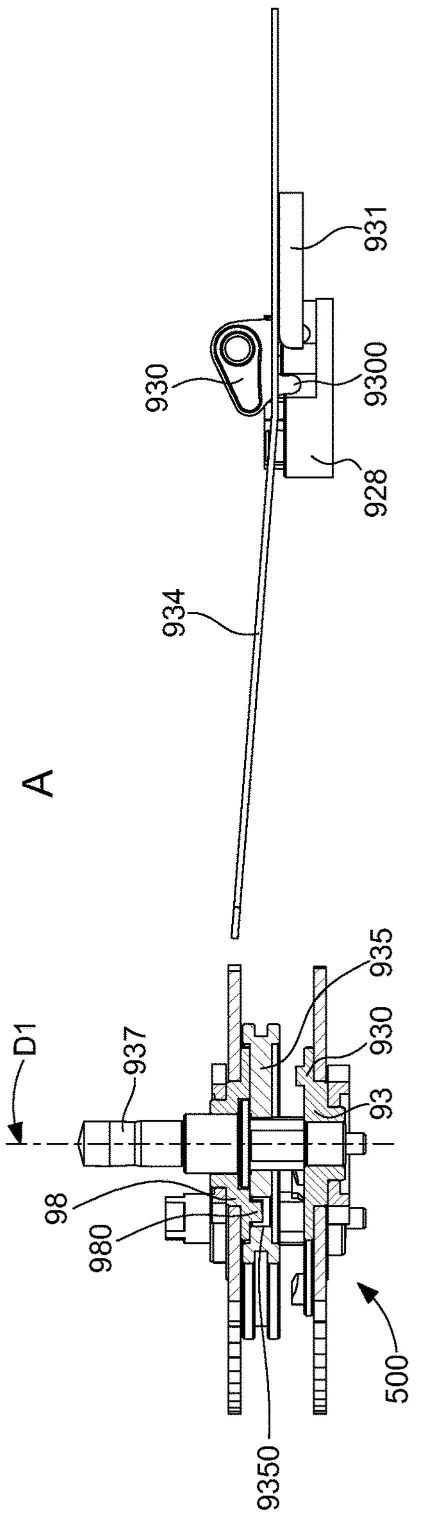

FIGS. 36 to 38 show the control mechanism in FIGS. 5 to 7 in a switching start position; the spring strip 934 is bent in its rest position, and is not in contact with the pivoting flap 930, the sliding wheel sets 935 and 936 being in a high position.

FIGS. 39 to 41 show the same mechanism in an uncoupling position for the minutes and hours. The spring strip 934 is pressed by the pivoting flap 930, the sliding wheel sets 935 and 936 being in the middle position. In FIG. 39, an arrow shows the motion of the third lever 925, the pin 9280, which was at the end of its travel in the slot 9250 in FIGS. 3 and 36, now being approximately in the middle of this slot.

FIG. 42 shows, in a similar manner to FIG. 9, the feature of the mechanism for returning to the rest position, with the passage through a dead centre PM when the return spring 933 ceases to oppose the switching, before accompanying this switching.

Figure 44:
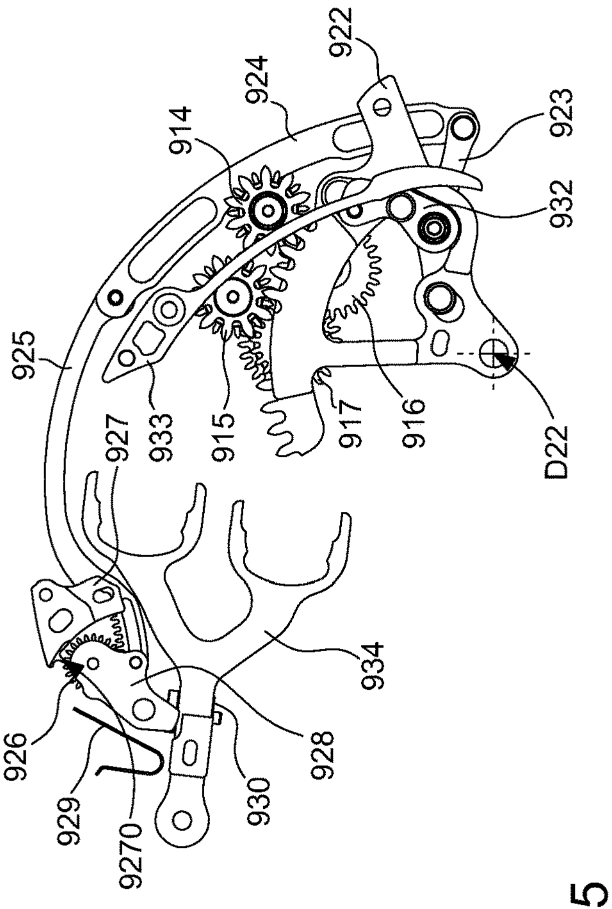
Figure 43:
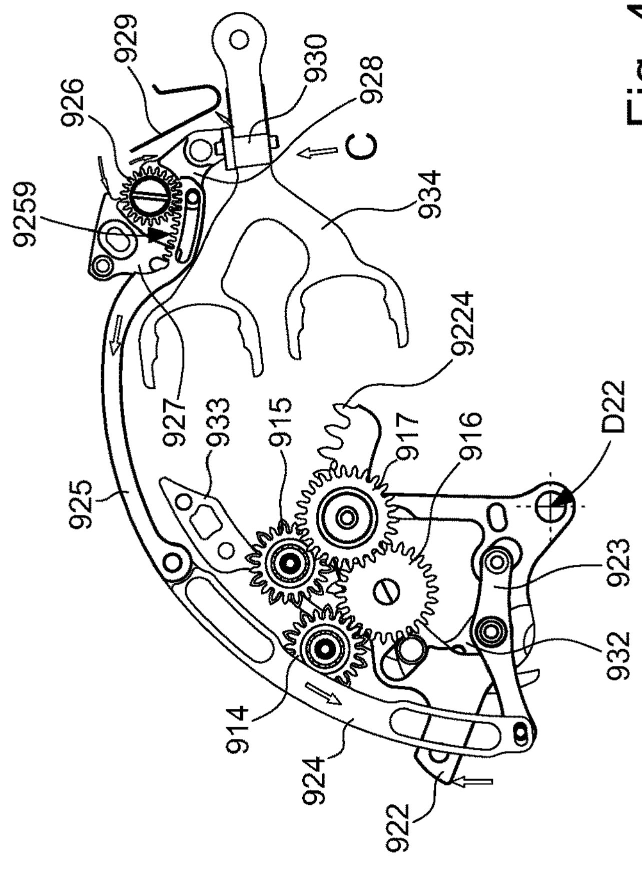
Figure 45:
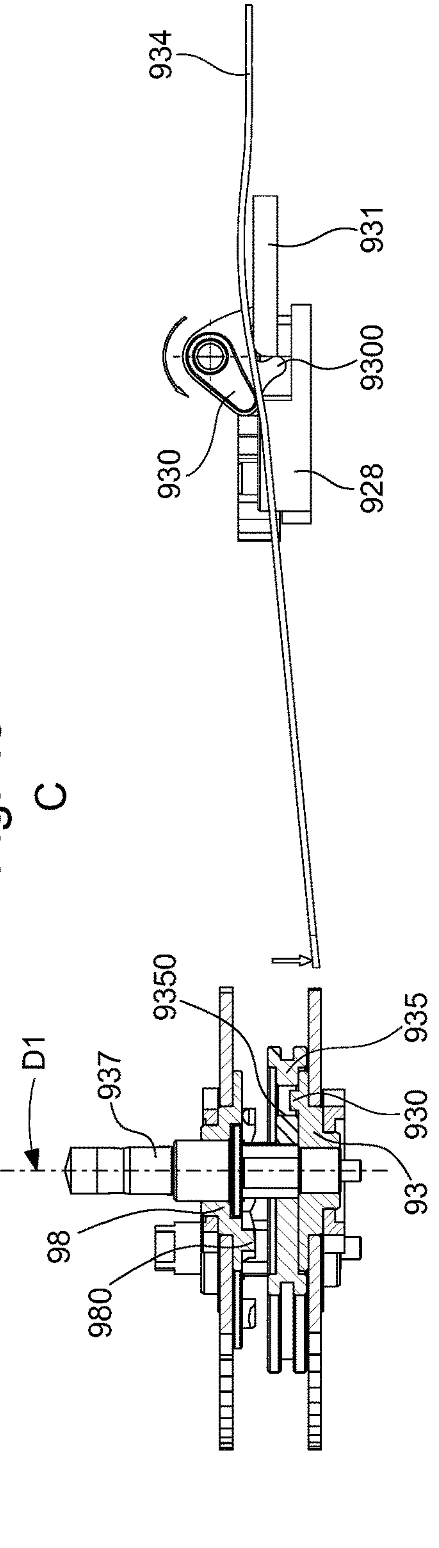

FIGS. 43 to 45 show the same control mechanism in an uncoupling position for the minutes and hours. The spring strip 934 is pressed by the pivoting flap 930 in the lowest position thereof, the sliding wheel sets 935 and 936 being in the low position. FIG. 43 shows that the pin 9280 is now at the end of its travel in the slot 9250 on the opposite side to that shown in FIGS. 3 and 36.

FIGS. 46 to 49 show the cooperation between the control lever 922 and the first freewheel wheel set 914 and the second freewheel wheel set 915, visible in FIGS. 22 to 25.

FIG. 46 shows the cooperation between the first freewheel wheel set 914, moving in the clockwise direction, and a first lower cylindrical bearing surface 9222 of the control lever 922, preventing it from rotating, and the cooperation between a second freewheel wheel set 915, moving in the anti-clockwise direction, and a second upper toothed sector 9224 of the control lever 922, allowing it to rotate.

FIG. 47 shows the control lever 922 with, at its lower part arranged to cooperate with the first freewheel wheel set 914, a first cylindrical bearing surface 9222 adjacent to a first toothed sector 9221, and, at its upper part arranged to cooperate with the second freewheel wheel set 915, a second cylindrical bearing surface 9223 adjacent to a second toothed sector 9224, these toothed sectors 9221 and 9224 extending on either side of the cylindrical bearing surfaces 9222 and 9223.

Figure 49:
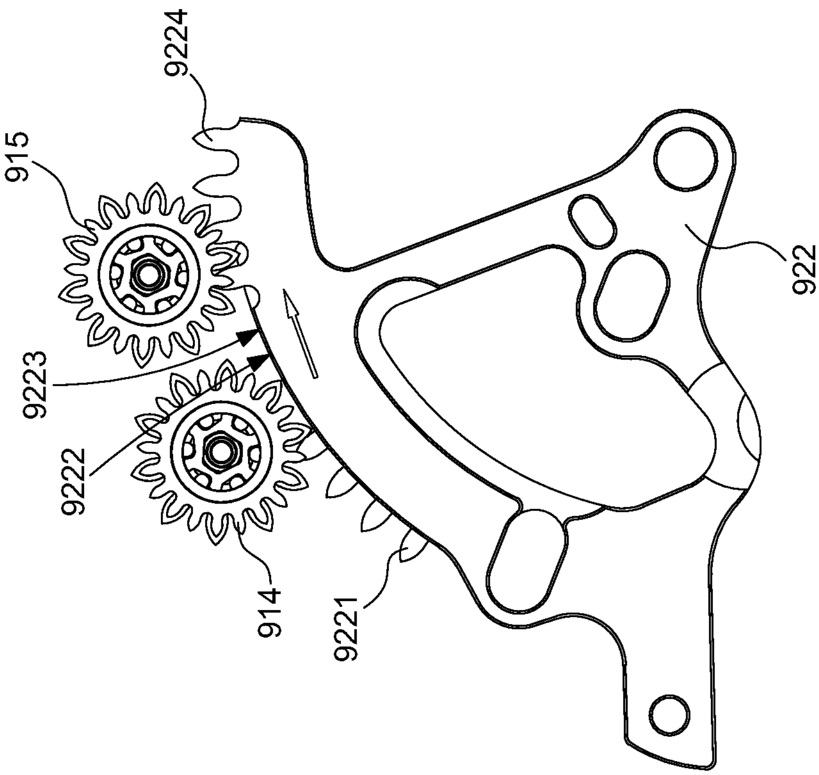
Figure 48:
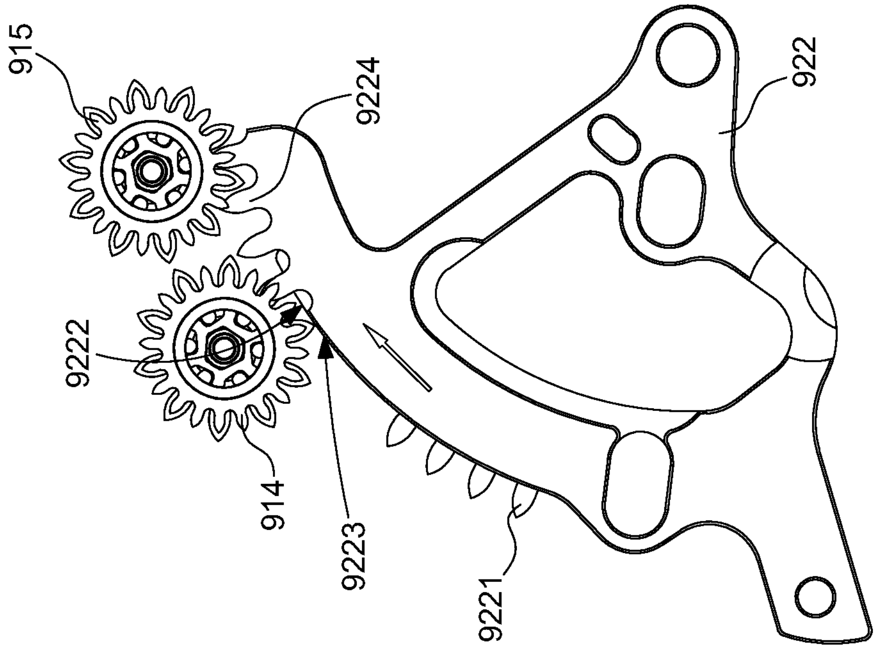

FIG. 48 shows the lever and the freewheels in the position shown in FIG. 46 when the control lever 922 starts to rotate clockwise. FIG. 49 shows them as the clockwise rotation of the control lever 922 continues, during which time the first freewheel wheel set 914 leaves the first cylindrical bearing surface 9222 to mesh with the first toothed sector 9221, whereas the second freewheel wheel set 915 leaves the second toothed sector 9224 to bear against the second cylindrical bearing surface 9223.

Figure 50:
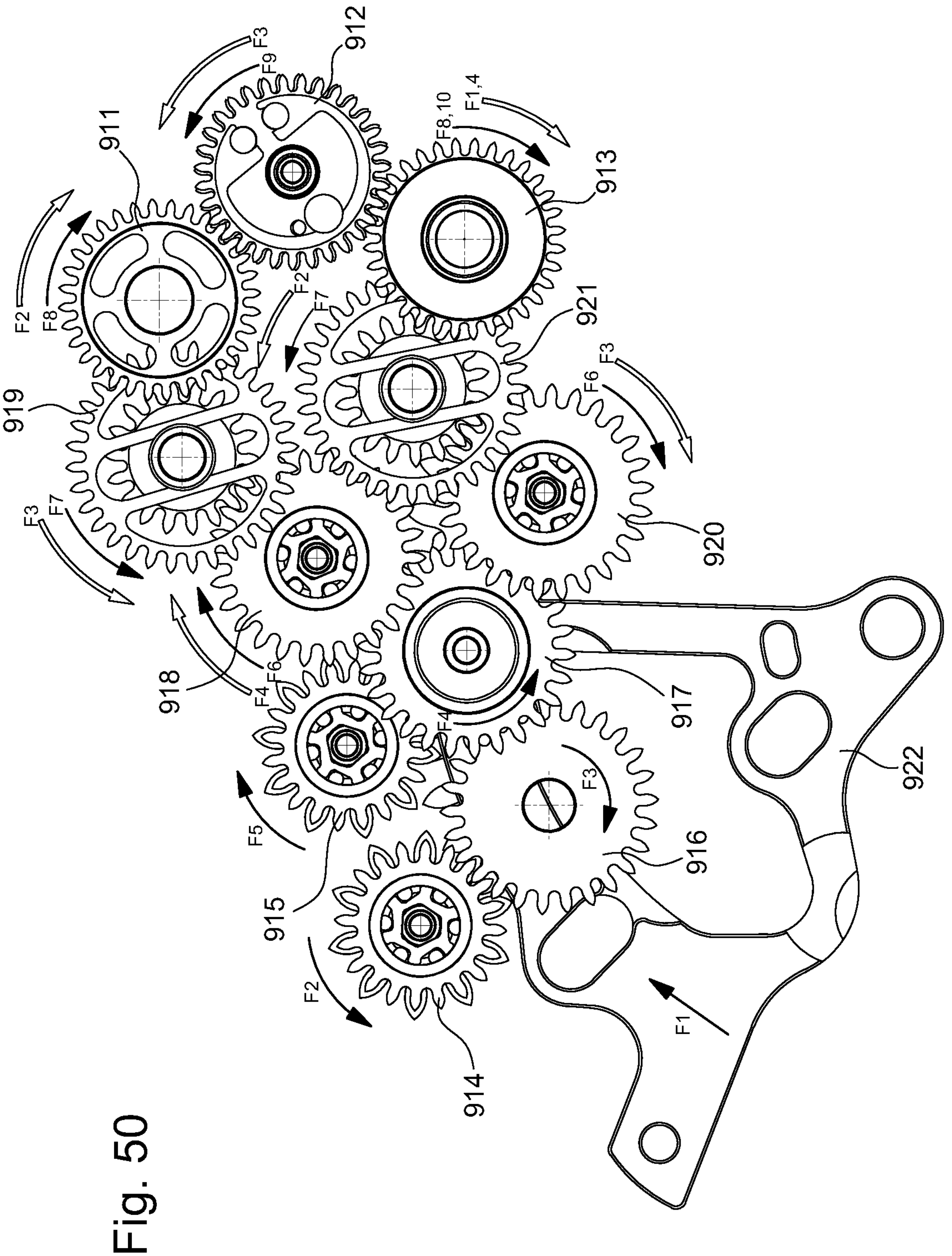

FIG. 50 groups together the control lever 922 and the cooperation between the various wheels comprised in:

- the rotation compensating mechanism of FIGS. 22 to 25 comprising the first freewheel wheel set 914 and the second freewheel wheel set 915 of FIGS. 46 to 49;

the hour rotation decoupling mechanism of FIGS. 26 to 28, comprising a third freewheel wheel set 918 meshing with an hour friction wheel set 919;

the minute rotation decoupling mechanism of FIGS. 29 to 31, comprising a fourth freewheel wheel set 920 meshing with a minute friction wheel set 921;

the transfer train of the hour display of FIGS. 32 to 34.

The time information corresponding to each of the two movements is stored in the coupling discs of the lower minute wheel 93, or upper minute wheel 98, or of the lower hour wheel 95, or upper hour wheel 910. The minute wheels/hour wheels, including the coupling discs, are constantly rotating with the driving motions. The purpose of the switch is to access the stored time information from only one of the two movements at a time.

Switching from the time information of the upper movement to that of the lower movement will firstly be described.

Start point: the corresponding time (currently from the upper movement) is input via the minute arbor of the train on a first upper minute input wheel 96 by means of a first friction-piece (which friction-piece is required to correct the time to be displayed);

the rotary motion is transferred, via an upper minute input setting-wheel 97 to the upper minute coupling wheel 98;

this upper minute coupling wheel 98 is equipped with protrusions 980, which can be inserted into corresponding slots 9350 in a minute coupling disc 935, in a single position per 360° revolution, to establish a coupling connection between the upper minute coupling wheel 98 and the minute coupling disc 935;

the spring strip 934, which is pre-stressed (towards the dial side) presses the minute coupling disc 935 onto the upper minute coupling wheel 98, and thus ensures transmission of the rotary motion;

the minute coupling disc 935 is made integral with a minute coupling arbor 937 such that it rotates therewith, for example by means of a square or the like, and thus transmits the rotary motion to a cannon-pinion 939, which is integral with the minute coupling arbor 937 by driving in or the like; the minute hand is fixed to this cannon-pinion 939;

for the time display, the corresponding reduction between the upper minute coupling wheel 98 and an upper hour wheel 910 is obtained by means of an upper step wheel 99;

the upper hour wheel 910 is also equipped with protrusions 9100, which can, in a similar manner, be inserted into corresponding slots 9360 in an hour coupling disc 936 for coupling between the upper hour wheel 910 and the hour coupling disc 936;

the second coupling disc 936 is made integral with an hour coupling arbor 938 for rotation therewith, for example by means of a square or the like; a first hour transfer wheel 911 is made integral with the second arbor 938 for rotation therewith, by means of a square or the like;

the rotary motion of the hour is transferred, via an hour transfer intermediate wheel 912, to an hour wheel 913, on which the hour hand is mounted.

Switching is carried out via a switching element on the case, and the user can switch between the two time information values. This switching element drives a first rack lever, which is formed in this case by a control lever 922, or is formed as in this case by a protuberance of this control lever 922, in order to cause it to pivot about the axis D22 in FIGS. 39 and 40.

The full stroke of the control lever 922 is divided into two stroke parts and includes the control of the spring strip 934 (for uncoupling), as well as the transmission of the rotary motion for selecting the position and re-coupling the minute coupling disc 935 and hour coupling disc 936.

In the first stroke part, the minute coupling disc 935 and hour coupling disc 936 are disengaged from the upper minute coupling wheel 98 and from the upper hour wheel 910 respectively.

The second stroke part allows the rotary motion to be transferred to the minute coupling arbor 937 and hour coupling arbor 938, thus allowing the minute coupling disc 935 and hour coupling disc 936 to be brought to bear against, for feeler purposes, as well as to be engaged with the protrusions of the lower minute coupling wheel 93 and of the lower hour coupling wheel 95.

The first stroke part will now be described in detail:

Coupling: in this case, the control lever 922 is tilted upwards (in the top view), via a first lever 923 and a second lever 924 articulated to this first lever 923, a third lever 925 articulated to the second lever 924 is pulled in the anti-clockwise direction;

the third lever 925 provided with a rack is guided by means of a pin in a fourth lever 928, and the rack thereof meshes with a rolled pinion 926, pivoted on the fourth lever 928;

the pinion 926 is held by a single tooth 9270 comprised in a plate 927, this fourth lever 928 being held pressed against the plate 927, in the anti-clockwise direction, by means of a lever spring 929;

if the third lever 925 is now pulled in the anti-clockwise direction by means of the pinion 926, the latter hooks onto the single tooth of the plate 927, and causes an anti-clockwise rotary motion of the fourth lever 928;

the fourth lever 928 comprises a further pin, which cooperates with a pivoting flap 930, to deflect it downwards, and thus press on the spring strip 934; it is thus this pivoting flap 930 which determines the position of the spring strip 934, and which controls the switching;

the spring strip 934 is thus deflected downwards by the pivoting flap 930, which thus reduces the pressure with which the minute coupling disc 935 and the hour coupling disc 936 are pushed upwards on the upper minute coupling wheel 98 and on the upper hour wheel 910 respectively, until the minute coupling disc 935 and the hour coupling disc 936 are uncoupled;

from this point onwards, the minute coupling arbor 937 and hour coupling arbor 938 are free to rotate, as are the associated minute coupling disc 935 and hour coupling disc 936, as well as the display hands;

Rotary motion: a rotary motion imparted to the control lever 922 is not yet transmitted to the first ball bearing freewheel wheel set 914 and to the second ball bearing freewheel wheel set 915, which respectively allow clockwise and anti-clockwise rotations, which are blocking in the opposite direction, and which are designed to mesh, in certain positions only, with one of the two toothed sectors 9221 and 9224 comprised in the control lever 922, each toothed sector being adjacent to a cylindrical bearing surface 9222 or 9223 on which a wheel cannot be meshed, but can only slide.

the first ball bearing freewheel wheel set 914 in the clockwise direction is held in the angular position via the surface of a cylindrical bearing surface 9222 of the control lever 922;

the second ball bearing freewheel wheel set 915 in the anti-clockwise direction is driven by the toothed sector

9224 of the control lever 922, by the lower toothing and, since there is a rotary motion in the freewheel direction, this motion is not transferred to the upper toothing.

The state of the whole mechanism after completion of the first stroke part is shown in FIGS. 39 to 42, relative to the minute/hour decoupling. The end of the first stroke part is reached as soon as the toothed sector of the control lever 922 starts to mesh with the first ball bearing freewheel wheel set 914, and the transmission of the rotary motion is thus initiated.

The second stroke part will now be described in detail:

Coupling: the third lever 925 is pulled further anti-clockwise, and thus causes additional rolling of the pinion 926, and thus also additional pivoting of the fourth lever 928, which causes the pivoting flap 930 to pivot further, and thus exerts more pressure on the spring strip 934;

- the bearing pressure of the minute coupling disc 935 and hour coupling disc 936 is thus increased;
- the plate 927 comprising the single tooth can be adjusted such that the maximum pressure with which the minute coupling disc 935 and hour coupling disc 936 are respectively pressed onto the lower minute wheel 93 and onto the lower hour wheel 95 can be optimally adjusted (if the pressure is too low, the coupling discs are not pressed onto the protrusions; if the pressure is too high, it has the effect of slowing down the motion, which thus has a negative effect on the amplitude);
- from a certain point, the pinion 926 is thus completely above the single tooth 9270, and rolls and slides on further pulling from the third lever 925.

Rotary motion: the first ball bearing freewheel wheel set 914 is now (i.e. from the start of the second stroke part) driven by the toothed sector 9221 of the control lever 922;

- the rotary motion is transmitted through a first intermediate wheel 916 and through a second intermediate wheel 917;
- the second ball bearing freewheel wheel set 915 is still partially driven in the freewheel direction; further along its travel, it is then held in position by the cylindrical bearing surface 9223 of the control lever 922;
- the upper wheel of the second ball bearing freewheel wheel set 915 is driven by the second intermediate wheel 917;
- however, this does not lead to any blocking, as the upper wheel of the second ball bearing freewheel wheel set 915 is driven in the freewheel direction;
- after the second intermediate wheel 917, the rotary motion is transformed at a train for the minutes on the one hand, and a train for the hours on the other;
- this division is necessary because the respective couplings for the minute and the hour can be coupled at different moments in time, depending on the relative position of the protrusions (on the minute wheel or respectively on the hour wheel) relative to the instantaneous angular position of the minute coupling disc 935 and of the hour coupling disc 936;
- the two trains require a third ball bearing freewheel wheel set 918, and respectively a fourth ball bearing freewheel wheel set 920, in order to separate the train and the movement, relative to the rotary motion, during normal operation, if no switching of the displays of the two movements is required;
- furthermore, each of the two trains comprises a friction-piece, respectively a third minute friction wheel 921 and a fourth hour friction wheel 919, each arranged to slide as soon as the coupling is made between the respective coupling disc and the second upper minute wheel 98 comprising the protrusions for the minutes, or respectively the upper hour wheel 910 comprising the protrusions for the hours, however the control lever 922 has not yet completed its full travel;
- the third minute friction wheel 921 and the fourth hour friction wheel 919 mesh with the cannon-pinion 939 or respectively with an hour wheel 940 mounted such that it is integral with the hour coupling arbor 938 for rotation therewith, and can thus transfer the rotary motion, via the form-fitting connection thereof, allowing torque transfer, to the minute coupling arbor 937 or respectively to the hour coupling arbor 938, and thus to the minute coupling disc 935 and hour coupling disc 936;
- the minute coupling disc 935 and the hour coupling disc 936 are rotated by a maximum value of 360°, until the slots contained therein come into alignment with the protrusions of the lower minute wheel 93 or respectively of the lower hour wheel 95;
- the displays, which are in particular but not limited to hands, also rotate by a maximum of 360° (clockwise).

Rest position: the locking of the mechanism, and thus the positioning at the start or respectively at the end of each switching by the user, takes place via a return spring 933, which pushes the control lever 922 onto a return control lever 932, in the end-of-travel positions, in the manner of a dead centre spring strip;

- in the first half of the angle of rotation of the control lever 922, the return spring 933 opposes and counteracts the rotary motion; in the second half of the rotary motion, the return spring 933 accompanies the rotary motion and pushes the control lever 922 as far as possible, into its final position.

As regards the reverse manoeuvre, the processes for switching from the time information of the lower movement to that of the upper movement are similar to those for switching from the upper movement to the lower movement described hereinabove.

Only the direction of rotation of the control lever 922 and the associated motion of the control over the spring strip 934 are reversed. The path of the control lever 922 is again divided into two stroke parts.

First Stroke Part:

Coupling: under the pressure of the spring strip 934, the fourth lever 928 is pushed against the pinion 926 in the clockwise direction until it reaches the single tooth of the plate 927;

- as the motion of the control lever 922 continues, the third lever 925 is pivoted clockwise;
- the pinion 926 can now roll on the single tooth of the plate 927, and thus on the fourth lever 928 in the clockwise direction, which relaxes the spring strip 934, which pushes the minute coupling disc 935 and the hour coupling disc 936 upwards until they are uncoupled from the upper minute wheel 93, or respectively from the upper hour wheel 95.

Rotary motion: the second ball bearing freewheel wheel set 915 is held in position by the cylindrical bearing surface 9223 of the control lever 922;

- the first ball bearing freewheel wheel set 914 rotates in the freewheel direction and thus does not yet transmit any rotary motion.

Second Stroke Part:

Coupling: the spring strip 934 is relaxed even further;

- the pivoting flap 930 is no longer in contact with the spring strip 934;

the minute coupling disc 935 and the hour coupling disc 936 are applied and pressed onto the upper minute coupling wheel 98 or respectively the upper hour wheel 910.

Rotary motion: the rotary motion of the control lever 922 is transmitted by the toothing thereof, through the second ball bearing freewheel wheel set 915, to the trains 916-917-918-919, or respectively 916-917-920-921, towards the minute coupling arbor 937 and the hour coupling arbor 938, as far as the minute coupling disc 935 and hour coupling disc 936, in order to engage them with the projections of the upper minute coupling wheel 98, or respectively of the upper hour wheel 910.

The invention further relates to a timepiece 2000, in particular a watch, comprising at least one such horological mechanism 1000.

Advantageously, a structure 600 carries the switching and coupling mechanism 500, as well as the control means 300, which comprises a user-operated control member, in particular a part that is external to the timepiece, such as a stem, a push-piece, or the like.

More particularly, and as shown in FIG. 51, the horological mechanism 1000 comprises energy storage means 3000, which are arranged to supply energy to the first mechanism 100 and/or the second mechanism 200, in particular the first regulating member 1100 and/or the second regulating member 1200.

In this case, the third mechanism is the display mechanism 800.

More particularly, the energy storage means 3000 comprise a common energy source arranged to supply energy simultaneously to the first regulating member 1100 and the second regulating member 1200.

More particularly, one of either the first regulating member 1100 and second regulating member 1200 comprises an oscillator arranged to oscillate at a maximum frequency, and the other comprises an oscillator arranged to oscillate at a minimum frequency. More particularly, the maximum frequency is less than or equal to ten times the minimum frequency.

Figure 1:
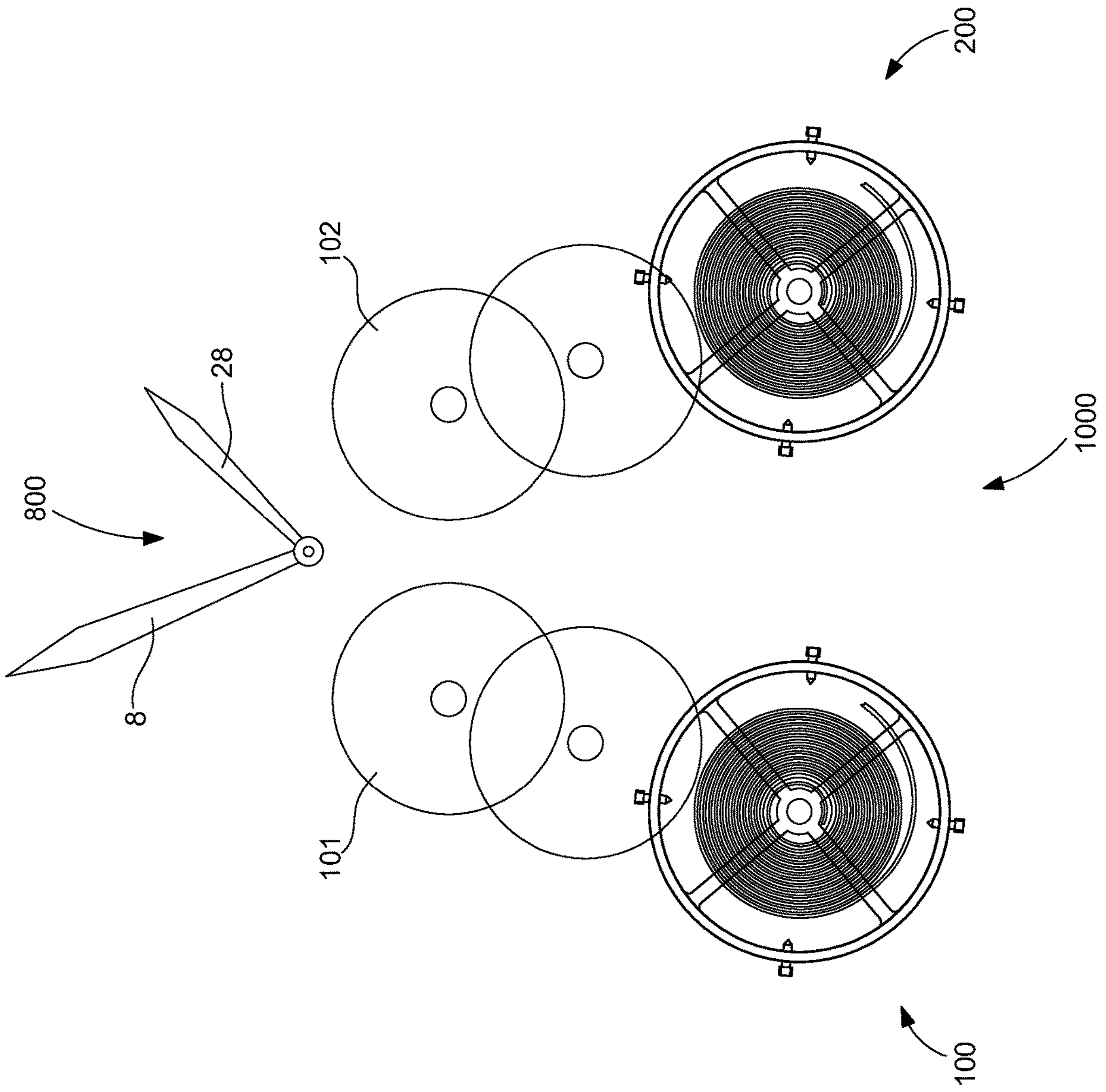
FIG. 1 diagrammatically shows a plan view of a conventional display mechanism such as a set of hands, which is, within the scope of the invention, arranged to cooperate with either one of two mechanisms, in particular two trains. This figure shows a specific case where each of these trains is an output of an oscillator, and where the two oscillators can have very different features.

Switching between a first and a second display indication on the same display medium, such as a conventional hands display shown in FIG. 1, requires three phases: uncoupling the first mechanism, in particular a first train, corresponding to the first display indication, finding synchronisation with the second mechanism, in particular a second train, corresponding to the second display indication, then coupling the second mechanism, in particular a second train. These three phases are carried out through the two functional mechanisms:

- axial coupling, which allows each train to be coupled and uncoupled to and from the sliding wheel set;
- the rotational driving mechanism, which allows for the input of new information to be displayed;

The invention further relates to a method for switching between two continuously-operating input mechanisms 100, 200 comprised in a horological mechanism, in order to control an output mechanism comprised in the same horological mechanism.

According to this method, a switching and coupling mechanism arranged for the alternating and exclusive coupling between, on the one hand, the first mechanism 100 or the second mechanism 200, which constitute two inputs, and on the other hand, said third mechanism constituting an output, is inserted between, on the one hand, these two input mechanisms 100, 200 and, on the other hand, this output mechanism.

This horological mechanism is equipped with a control means that can be operated by a user to uncouple the mechanism from among the first mechanism 100 and second mechanism 200 that is at this moment engaged with the third mechanism, and to engage the other from among the first mechanism 100 and second mechanism 200 with the third mechanism.

Moreover, said switching and coupling mechanism is equipped with mechanical coupling means, which are arranged to allow for coupling in a single angular position per revolution, on the one hand the first mechanism 100 or the second mechanism 200, with on the other hand said third mechanism, these mechanical coupling means allowing for coupling solely in this single angular position.

Moreover, when a user actuates the control means to uncouple the first mechanism 100 or said second mechanism 200 thus engaged with the third mechanism, a sliding wheel set is moved, between two input wheel sets connected respectively to the first mechanism 100 and to the second mechanism 200 and each comprising a front relief, by a lever and/or a control spring, in order to push it towards the input wheel set corresponding to the mechanism from among the first mechanism 100 and the second mechanism 200 that was not engaged at the moment of the command and, as soon as they are brought into contact with one another, the rotation of this input wheel set is continued until the front relief thereof cooperates with a complementary front relief comprised in said sliding wheel set, said front relief and said complementary front relief being such that the cooperation therebetween can be achieved in a single angular position during one relative revolution therebetween, and then the coupling thereof is completed by an axial push.

More particularly, this horological mechanism is a horological mechanism 1000 as described hereinabove, the switching and coupling mechanism is the switching and coupling mechanism 500 as described hereinabove, and the control means is the control means 300 as described hereinabove.

The invention claimed is:

1. A horological mechanism (1000) comprising a first mechanism (100) comprising a first output wheel set (101) capable of pivoting, and a second mechanism (200) comprising a second output wheel set (102) capable of pivoting, a position of said first output wheel set (101) being associated with a first input variable, and a position of said second output wheel set (102) being associated with a second input variable, and whereby said first mechanism (100) and said second mechanism (200) are arranged to control, each in turn, the motion of a third mechanism, and the driving of at least a third output wheel set comprised in said third mechanism, wherein said horological mechanism (1000) comprises a switching and coupling mechanism (500) arranged for an alternating and exclusive coupling between said first mechanism (100) or said second mechanism (200), which constitute two inputs each operating continuously, and said third mechanism constituting an output, wherein said horological mechanism (1000) comprises a control means (300) that can be operated by a user to uncouple one of said first mechanism (100) and second mechanism (200) that is engaged with said third mechanism, and to engage the other of said first mechanism (100) and second mechanism (200) with said third mechanism, said switching and coupling mechanism (500) coupling, in a single angular position per revolution, said first mechanism (100) or said second mechanism (200), with said third mechanism, and allowing for coupling solely in said single angular position.

2. The horological mechanism (1000) according to claim 1, wherein said horological mechanism (1000) comprises said switching and coupling mechanism (500) to produce a switchable display, wherein said third mechanism is a display mechanism for the respective display, on demand, on said at least one third output wheel set, which is a display means (800, 8, 28), of a first indication or a second indication characteristic of said first input variable or of said second input variable.

3. The horological mechanism (1000) according to claim 1, wherein said switching and coupling mechanism (500) comprises two input wheel sets (1; 2), each constituted by said output wheel set (101; 102), or driven directly by said output wheel set (101; 102), and comprises a sliding wheel set (5, 935, 936) capable of moving axially under constant strain between said two input wheel sets (1; 2), which sliding wheel set (5, 935, 936) is arranged to cooperate alternately and exclusively, by frontal clicking in its axial direction of mobility, in a single angular position per revolution, with either one of said two input wheel sets (1; 2), selected under the action of a command imparted by a user to a control means (300), comprised in said horological mechanism (1000), to establish a driving connection between said input wheel set (1; 2) engaged with said sliding wheel set (5, 935, 936) said at least one third output wheel set in order to cause it to pivot by a stroke that is characteristic of said first input variable or of said second input variable.

4. The horological mechanism (1000) according to claim 3, wherein said horological mechanism (1000) comprises a first coupling arbor (937) according to a first slide axis (D1) and on which said sliding wheel set (5, 935, 936) is mounted such that it slides, wherein, in order to display a first minute display function, said sliding wheel set is a first sliding wheel set (5, 935) and said two input wheel sets (1; 2) are coaxial around a first slide axis (D1), and are arranged to drive, by friction, a lower minute coupling wheel (3, 93), or respectively an upper minute coupling wheel (4, 98), and wherein said first sliding wheel set (5, 935) can be axially coupled with only one of said lower minute coupling wheel (3, 93) and upper minute coupling wheel (4, 98) at a time, by the cooperation of complementary reliefs in a single relative angular position per revolution for each said lower minute coupling wheel (3, 93) and upper minute coupling wheel (4, 98), and is held in the coupling position thereof by at least one spring strip (934), comprised in said control means (300), and which is arranged to control the axial positioning and then hold that axial position of said first sliding wheel set (5, 935), and wherein said control means (300) is further arranged to impart rotational travel to said first sliding wheel set (5, 935), to find the first coupling position between said first sliding wheel set (5, 935) and that of said coupling wheels (3, 93; 4, 98) towards which it is pushed.

5. The horological mechanism (1000) according to claim 4, wherein said first sliding wheel set (5, 935) is mounted such that it slides on said first coupling arbor (937) with which it is rotationally indexed, which first coupling arbor (937) is arranged to cause, either directly or indirectly, said display means (800, 8, 28) to rotate, and wherein said first sliding wheel set (5, 935) constitutes a coaxial sliding coupling sleeve, for coupling with either said lower minute coupling wheel (3, 93) or said upper minute coupling wheel (4, 98), which lower minute coupling wheel (3, 93) and upper minute coupling wheel (4, 98) respectively comprise a first coupling element (930) and a second coupling element (980), which are arranged to cooperate alternately in the coupling position, one at a time, with a first complementary coupling element (9350) or with a second complementary coupling element (9350) comprised in said first sliding wheel set (5, 935), and wherein said control means (300) is arranged to impart axial travel to said first sliding wheel set (5, 935) as far as abutment against said lower minute coupling wheel (3, 93) or respectively against said upper minute coupling wheel (4, 98), and to impart rotational travel to said first sliding wheel set (5, 935), to find the first coupling position between said first sliding wheel set (5, 935) and said lower minute coupling wheel (3, 93), or respectively said upper minute coupling wheel (4, 98), towards which it is pushed.

6. The horological mechanism (1000) according to claim 4, wherein said switching and coupling mechanism (500) comprises at least one said spring strip (934) which constitutes a resilient return means, arranged to axially push said first sliding wheel set (5, 935) to abut against said lower minute coupling wheel (3, 93), or respectively said upper minute coupling wheel (4, 98), towards which it is pushed.

7. The horological mechanism (1000) according to claim 4, wherein said control means (300) is arranged to impart rotational travel to an intermediate wheel (99) integral with said first sliding wheel set (5, 935) for rotation therewith, to find a single coupling position per revolution between said first sliding wheel set (5, 935) and said lower minute coupling wheel (3, 93) or said upper minute coupling wheel (4, 98) towards which it is pushed, and wherein said first coupling arbor (937) is arranged to cause said display means (800, 8, 28) to rotate, through a train incorporating said intermediate wheel (99), or through said intermediate wheel (99), which is rotationally indexed with said first coupling arbor (937).

8. The horological mechanism (1000) according to claim 4, wherein said first sliding wheel set (5, 935) comprises, on a first face facing said lower minute coupling wheel (3, 93), and on a second face facing said upper minute coupling wheel (4, 98), at least one post, or respectively one slot, which is arranged to cooperate in a complementary manner with a slot, or respectively a post, comprised in said lower minute coupling wheel (3, 93), and respectively said upper minute coupling wheel (4, 98), in a single cooperation position during a relative rotation of less than or equal to 360°, during said rotational travel of said first sliding wheel set (5, 935).

9. The horological mechanism (1000) according to claim 4, wherein said mechanism (1000) comprises, in order to display another time function for the hour display, at least one second coupling arbor (938) according to a second slide axis, equipped, as for said first coupling arbor (937), with a second sliding wheel set (936), wherein said output wheel sets (101; 102) are arranged to drive a lower hour coupling wheel (95), or respectively an upper hour coupling wheel (910), and wherein said second sliding wheel set (936) can be axially coupled with only one of said lower hour coupling wheel (95) and upper hour coupling wheel (910) at a time, by the cooperation of complementary reliefs in a single relative angular position per revolution for each said lower hour coupling wheel (95) and upper hour coupling wheel (910), and is held in the coupling position thereof by said spring strip (934), which is arranged to control the axial positioning and then hold that axial position of said second sliding wheel set (936), and wherein said control means (300) is further arranged to impart rotational travel to said second sliding wheel set (936), to find the first coupling position between said second sliding wheel set (936) and that of said coupling wheels (95; 910) towards which it is pushed.

10. The horological mechanism (1000) according to claim 4, wherein said control means (300) comprises, between a user-operated control lever (922) with toothed sectors for controlling the rotary motion and couplings, and a pivoting flap (930) intended to exert a bearing force on said spring strip (934) comprising at least one fork (9345, 9346) for connecting with at least one said sliding wheel set (935, 936), a succession of levers (923, 924, 925, 928) articulated to one another and the last (928) whereof controls the rotation of said pivoting flap (930), such that it rotates about an axis parallel to the plane to which all of said levers (923, 924, 925, 928) are parallel, and thus control the deformation and/or the motion of said spring strip (934) so as to control the switching.

11. The horological mechanism (1000) according to claim 10, wherein said control means (300) comprises a mechanism for returning to the rest position, comprising a return lever (932) articulated to said control lever (922) that guides it, and, bearing against a pin of said return lever (932), a return spring (933) of dimensions similar to those of the largest of said levers (923, 924, 925, 928), and which pushes said control lever (922) onto said return lever (932) in the final position, and constitutes a dead centre spring.

12. The horological mechanism (1000) according to claim 10, wherein said horological mechanism (1000) comprises a transfer train of the lower movement, which successively comprises a lower minute input wheel (91), comprising a friction-piece for adjusting the display, a lower reversing intermediate wheel (92), a lower minute coupling wheel (93), a lower reversing wheel (94), and a lower hour coupling wheel (95).

13. The horological mechanism (1000) according to claim 10, wherein said horological mechanism (1000) comprises a transfer train of the upper movement, which successively comprises an upper minute input wheel (96), comprising a friction-piece for adjusting the display, an upper reversing intermediate wheel (97), an upper minute coupling wheel (98), an upper reversing wheel (99), and an upper hour coupling wheel (910).

14. The horological mechanism (1000) according to claim 10, wherein said horological mechanism (1000) comprises a rotation compensating mechanism comprising a first freewheel wheel set (914) which is free in the clockwise direction, and a second freewheel wheel set (915) which is blocking in the opposite direction to said first freewheel wheel set (914), connected by a first intermediate wheel (916) and by a second intermediate wheel (917), and which are arranged to cooperate with separate, smooth or toothed tracks, comprised in said control lever (922) so as to respectively prohibit or authorise the rotation thereof.

15. The horological mechanism (1000) according to claim 10, wherein said horological mechanism (1000) comprises an hour rotation decoupling mechanism, comprising a third freewheel wheel set (918), which decouples the switching motion under normal running, meshing with a third hour friction wheel set (919), arranged to compensate for the remaining rotary motion after coupling, and comprises a minute rotation decoupling mechanism, comprising a fourth freewheel wheel set (920), arranged to decouple the switching motion under normal running, meshing with a fourth minute friction wheel set (921), arranged to compensate for the remaining rotary motion after coupling.

16. The horological mechanism (1000) according to claim 10, wherein said horological mechanism (1000) comprises a transfer train of the hour display, which comprises a first hour transfer wheel (911), integral so as to rotate as one with an hour arbor (938) carrying the hour sliding wheel set (936), downstream of the hour rotation decoupling mechanism, and which meshes with an hour transfer intermediate wheel (912), with an integrated spring to compensate for play in the toothing, in order to drive an hour wheel (913) mounted coaxially to a cannon-pinion (939) on the minute coupling arbor (937).

17. The horological mechanism (1000) according to claim 1, wherein said first output wheel set (101) and said second output wheel set (102) are in constant rotation.

18. The horological mechanism (1000) according to claim 1, wherein said first output wheel set (101) and second output wheel set (102) are arranged to control the respective display, on at least one said display means (800, 8, 28), of at least a first and a second said indications, which are time indications.

19. The horological mechanism (1000) according to claim 1, wherein said first mechanism includes a first train; (100) which is driven by a first regulating member (1100), wherein said second mechanism includes a second train; (200) which is driven by a second regulating member (1200), and wherein said first regulating member (1100) and second regulating member (1200) are arranged to operate continuously, independently of one another, and without user intervention, for the respective display of at least a first and a second time indication, and respectively comprise a first input wheel set (1) and a second input wheel set (2) which are in constant rotation.

20. The horological mechanism (1000) according to claim 19, wherein said first regulating member (1100) and said second regulating member (1200) are regulated in different ways.

21. The horological mechanism (1000) according to claim 19, wherein said horological mechanism (1000) comprises energy storage means (3000) arranged to supply energy to said first regulating member (1100) and second regulating member (1200).

22. The horological mechanism (1000) according to claim 21, wherein said energy storage means (3000) comprise a common energy source arranged to supply energy simultaneously to each of said first regulating member (1100) and second regulating member (1200).

23. The horological mechanism (1000) according to claim 19, wherein one of said first regulating member (1100) and second regulating member (1200) comprises an oscillator arranged to oscillate at a maximum frequency, and the other thereof comprises an oscillator arranged to oscillate at a minimum frequency, and said maximum frequency is less than or equal to ten times said minimum frequency.

24. A timepiece (2000) comprising at least one horological mechanism (1000) according to claim 1.

25. A method for switching between two continuously-operating input mechanisms (100; 200) comprised in a horological mechanism, in order to control an output mechanism comprised in the same horological mechanism, wherein a switching and coupling mechanism arranged for an alternating and exclusive coupling between said first mechanism (100) or said second mechanism (200), which constitute two inputs, and said third mechanism constituting an output, is inserted between said two input mechanisms (100; 200) and said output mechanism, wherein said horological mechanism comprises a control means that can be operated by a user to uncouple one of said first mechanism (100) and second mechanism (200) that is engaged with said third mechanism, and to engage the other of said first mechanism (100) and second mechanism (200) with said third mechanism, and wherein said switching and coupling mechanism allowing for coupling in a single angular position per revolution said first mechanism (100) or said second mechanism (200), with said third mechanism, and also allowing for coupling solely in said single angular position, and wherein, when a user actuates said control means to uncouple said first mechanism (100) or said second mechanism (200) thus engaged with said third mechanism, a sliding wheel set is moved, between two input wheel sets connected respectively to said first mechanism (100) and to said second mechanism (200) and each comprising a front relief, by a lever and/or a control spring, in order to push it towards the input wheel set corresponding to one of said first mechanism (100) and second mechanism (200) that was not engaged at the moment of the command and, as soon as they are brought into contact with one another, the rotation of this input wheel set is continued until the front relief thereof cooperates with a complementary front relief comprised in said sliding wheel set, said front relief and said complementary front relief being such that the cooperation therebetween can be achieved in a single angular position during one relative revolution therebetween, and then the coupling thereof is completed by an axial push.

* * * * *